US010182107B2

(12) United States Patent
Jain

(10) Patent No.: US 10,182,107 B2
(45) Date of Patent: *Jan. 15, 2019

(54) MULTI-TENANT APPLICATION USING HIERARCHICAL BEAN FACTORY CONTAINER

(71) Applicant: Oracle International Corporation, Redwood Shores, CA (US)

(72) Inventor: Vikrant Jain, Delhi (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/178,435

(22) Filed: Jun. 9, 2016

(65) Prior Publication Data

US 2016/0323368 A1 Nov. 3, 2016

Related U.S. Application Data

(63) Continuation of application No. 14/484,818, filed on Sep. 12, 2014, now Pat. No. 9,391,972.

(51) Int. Cl.
*G06F 17/30* (2006.01)
*H04L 29/08* (2006.01)
(Continued)

(52) U.S. Cl.
CPC .......... *H04L 67/1002* (2013.01); *G06F 9/455* (2013.01); *G06F 21/31* (2013.01);
(Continued)

(58) Field of Classification Search
CPC ............ H04L 67/1002; H04L 41/0893; H04L 67/327; H04L 63/10; H04L 63/08; H04L 63/101; H04L 63/14
(Continued)

(56) References Cited

U.S. PATENT DOCUMENTS 8,316,125 B2 11/2012 DeHaan
8,346,935 B2 1/2013 Mayo et al.
(Continued)

FOREIGN PATENT DOCUMENTS

WO 2013-163680 A1 11/2013

OTHER PUBLICATIONS

Amazon EC2 Product Details. Amazon.com [online]. Copyright 2014 Amazon Web Services, Inc. [retrieved Dec. 17, 2014]. Retrieved from the Internet: <URL: http://aws.amazon.com/ec2/details/>, 15 pages.
(Continued)

*Primary Examiner* — Mohammad W Reza
(74) *Attorney, Agent, or Firm* — Kilpatrick Townsend & Stockton LLP

(57) ABSTRACT

Various embodiments provide on premise and cloud deployment support for components that may not be multi-tenant enabled. A single application in a highly non-intrusive way without effecting application functional logic. On premise deployments can run with fixed default tenant and no tenant information needs to be captured anywhere anytime. The application code accesses the hierarchical bean factory to get any tenant specific or shared resources seamlessly without knowledge of multi-tenancy in functional code anywhere.

29 Claims, 17 Drawing Sheets

(51) Int. Cl.
H04L 29/06 (2006.01)
G06F 9/455 (2018.01)
G06F 21/31 (2013.01)
H04L 12/24 (2006.01)

(52) U.S. Cl.
CPC .......... H04L 41/0893 (2013.01); H04L 63/08 (2013.01); H04L 63/10 (2013.01); H04L 65/40 (2013.01); H04L 67/10 (2013.01); H04L 67/327 (2013.01); G06F 2009/45562 (2013.01); H04L 63/101 (2013.01); H04L 63/14 (2013.01)

(58) Field of Classification Search
USPC .......................................................... 726/4
See application file for complete search history.

(56) References Cited

U.S. PATENT DOCUMENTS

| | | | |
|---|---|---|---|
| 8,533,261 | B2 | 9/2013 | Janedittakarn et al. |
| 8,621,051 | B2 | 12/2013 | Agarwala et al. |
| 8,793,379 | B2 | 7/2014 | Upadhya |
| 9,471,353 | B1 * | 10/2016 | Christopher ........ G06F 9/44521 |
| 2006/0070031 | A1 * | 3/2006 | Szyperski ................. G06F 9/54 717/120 |
| 2006/0080646 | A1 | 4/2006 | Aman |
| 2006/0184410 | A1 | 8/2006 | Ramamurthy et al. |
| 2010/0005443 | A1 | 1/2010 | Kwok et al. |
| 2010/0198845 | A1 * | 8/2010 | Kutsch .............. G06F 17/30941 707/755 |
| 2011/0213870 | A1 | 9/2011 | Cai et al. |
| 2011/0302133 | A1 * | 12/2011 | Kuruganti ......... G06F 17/30557 707/608 |
| 2011/0302212 | A1 | 12/2011 | Agrawal et al. |
| 2012/0143819 | A1 * | 6/2012 | Tan ................... G06F 17/30569 707/626 |
| 2012/0166488 | A1 | 6/2012 | Kaushik et al. |
| 2012/0191754 | A1 * | 7/2012 | Cecilia Torralba ......................... H04L 29/12132 707/770 |
| 2013/0014082 | A1 | 1/2013 | Kang et al. |
| 2013/0086322 | A1 | 4/2013 | Pelletier et al. |
| 2013/0145006 | A1 | 6/2013 | Tammam |
| 2014/0006580 | A1 | 1/2014 | Raghu |
| 2014/0007093 | A1 | 1/2014 | Deshpande et al. |
| 2014/0019459 | A1 * | 1/2014 | Gradin .............. G06F 17/30368 707/748 |
| 2014/0122649 | A1 * | 5/2014 | Calvin ................ G06F 17/3089 709/218 |
| 2014/0189070 | A1 * | 7/2014 | Gero ....................... H04L 67/06 709/219 |
| 2015/0007263 | A1 * | 1/2015 | Stewart ................... H04L 63/08 726/3 |
| 2016/0078120 | A1 | 3/2016 | Pradeep et al. |
| 2016/0087859 | A1 | 3/2016 | Kuan et al. |
| 2016/0087861 | A1 | 3/2016 | Kuan et al. |
| 2016/0140139 | A1 | 5/2016 | Torres et al. |
| 2016/0337215 | A1 | 11/2016 | Wunderlich et al. |

OTHER PUBLICATIONS

Amazon EC2. Amazon.com [online]. Copyright 2014 Amazon Web Services, Inc. [retrieved Dec. 17, 2014]. Retrieved from the Internet: <URL: http:aws.amazon.com/ec2/details/>, 6 pages.

Cloud Control Module—VMTurbo's Private Cloud Management Extension. vmturbo.com [online]. Copyright VMTurbo, Inc. [retrieved Dec. 17, 2014]. Retrieved from the Internet: <URL: http://vmturbo.com/product/control-modules/cloud-management-software/>, 3 pages.

Cloud Storage—Cloud Leverage. Cloudleverage.com [online]. Copyright 2009-2012 Cloud Leverage, Inc. [retrieved Dec. 17, 2014]. Retrieved from the Internet: <URL: http://cloudleverage.com/cloud-storage/>, 2 pages.

DataNucleus—JDO Multitenancy, "DataNucleus AccessPlatform 3.3 Documentation," located at http://datanucleus.org/products/accessplatform_3_3/jdo/multitena.., retrieved Jan. 29, 2014, 4 pages.

EMC Atmos Cloud Storage Architecture. EMC White Paper [online]. Sep. 2014, EMC Corporation [retrieved Dec. 17, 2014]. Retrieved from the Internet: <URL: http://www.emc.com/collateral/software/white-papers/h9505-emc-atmos-archit-wp.pdf>, 20 pages.

GIS Cloud. Giscloud.com [online]. Copyright 2014 GIS Cloud Ltd. [retrieved Dec. 16, 2014]. Retrieved from the Internet: <URL: http://www.giscloud.com/about-us/>, 9 pages.

GIS Cloud Multi-tenant Platform, GIS Cloud Developers. Giscloud.com [online]. Copyright 2014 GIS Cloud Developers [retrieved Dec. 16, 2014]. Retrieved from the Internet: <URL: http://developers.giscloud.com/overview/gis-cloud-multi-tenant-platform/>, 3 pages.

Google Cloud Platform: Storing and Analyzing Your Data in Google's Cloud. White Paper [online]. Google, Inc. [retrieved Dec. 17, 2014]. Retrieved from the Internet: <URL: https://cloud.google.com/files/articles/google-cloud_technical-article_overview-of-storage-options.pdf>, 14 pages.

Heroku Features. Heroku.com [online]. Heroku, Inc. [retrieved Dec. 17, 2014]. Retrieved from the Internet: <URL: https://www.heroku.com/features>, 8 pages.

Kony Cloud: Architecture and Security Overview. Technical Brief [online]. Copyright 2014 Kony Solutions, Inc. [retrieved Dec. 17, 2014]. Retrieved from the Internet: <URL: http://forms.kony.com/rs/konysolutions/images/Kony-DS-Architecture-and-Security-Overview.pdf>, 18 pages.

Commons Configuration—Multi-tenant Configuration, Apache Commons, Oct. 27, 2013, located at http://commons.apache.org/proper/commons-configuration/userguide/h . . . , retrieved Jan. 29, 2014, 2 pages.

U.S. Appl. No. 14/484,818 , "Non-Final Office Action", dated Nov. 20, 2015, 10 pages.

U.S. Appl. No. 14/484,818 , "Notice of Allowance", dated Mar. 14, 2016, 13 pages.

Hahn, M. "Approach and Realization of a Multi-tenant Service Composition Engine," University of Stuttgart, Diploma Thesis, Nr. 3546, Nov. 11, 2013, 111 pages.

Mladenov, T., "Multi-Tenancy Options in Cloud Environments," JAVA Developer's Journal, Jun. 3, 2013, located at http://java.sys-con.com/node/2684531, retrieved Jan. 29, 2014, 5 pages.

Ramdas, J. et al., "Extended Java EE containers with cloud characteristics," May 12, 2011; located at http://www.ibm.com/developerworks/cloud/library/cl-jeecontainercloud/, retrieved Jan. 28, 2014, 13 pages.

Non-Final Office Action for U.S. Appl. No. 14/728,697, dated Jan. 30, 2018, 20 pages.

Final Office Action for U.S. Appl. No. 14/728,697 dated Aug. 16, 2018, 14 pages.

* cited by examiner

MULTI-TENANT APPLICATION USING HIERARCHICAL BEAN FACTORY CONTAINER

CROSS-REFERENCES TO RELATED APPLICATIONS

This continuation application claims priority to and the benefit of U.S. Non-Provisional application Ser. No. 14/484,818 filed Sep. 12, 2014, entitled "MULTI-TENANT APPLICATION USING HIERARCHICAL BEAN FACTORY CONTAINER," now allowed, which is incorporated by reference herein in its entirety for all purposes.

BACKGROUND

The present disclosure relates to computer systems and software, and more particularly to techniques for facilitating and automating the provision of services in a cloud environment.

Cloud computing is a model for enabling convenient, on-demand network access to a shared pool of configurable computing resources (e.g., networks, servers, storage, applications, and services). The services provided or accessed through the cloud (or network) are referred to as cloud services. There is a lot of processing that needs to be performed by a cloud service provider to make cloud services available to a subscribing customer. Due to its complexity, much of this processing is still done manually. For example, provisioning resources for providing such cloud services can be a very labor intensive process.

Consumers and businesses have an expectation that ordering and starting the use of computer network cloud-based services be seamless. However, many cloud services are difficult to start up, requiring the provisioning of resources that might be shared. For example, servers in a server farm may run cloud services for many customers at once, and adding another customer may require shifting around resources. Different users may wish to employ different services. For example, some users may only want raw storage on the cloud, while other users may want to use sophisticated database storage. Still others may want the use of graphical user interface (GUI) software applications running on the cloud for its employees or customers.

There exists a need in the art for faster, less expensive, and easier-to-use cloud based computer systems.

SUMMARY

Generally, aspects of the present disclosure relate to enabling already provisioned services, such as database services and Java® services, in a computer network cloud infrastructure system to be reused in order to reduce the time to provision new services.

The disclosed techniques offer a faster, easier and non-intrusive way to achieve multi-tenancy/virtualization in applications including legacy applications, keeping most of the existing code/design as it is and improves code quality by reducing coupling. Various embodiments provide on premise and cloud deployment support for components that may not be multi-tenant enabled. A single application in a highly non-intrusive way without effecting application functional logic. On premise deployments can run with fixed default tenant and no tenant information needs to be captured anywhere anytime. The application code accesses the hierarchical bean factory to get any tenant specific or shared resources seamlessly without knowledge of multi-tenancy in functional code anywhere In certain embodiments, a computing device having one or more processors receives a hierarchical bean factory associated with an application. A parent bean factory represents a shared application context. Each child bean factory represents an entity specific application context. When a request is to invoke a function associated with the application, an entity is determined based on the request. A child bean factory in the hierarchical bean factory that is associated with the entity is determined. The function associated with the application can then be invoked using the child bean factory specific to the entity.

In one aspect, entity information is stored in a session context. The entity information can be accessed in order to determine the child bean factory. The entity information may be generated in response to authenticating a user of a tenant in a cloud infrastructure system, the tenant being the determined entity.

In various embodiments, one or more interfaces in the parent bean factory are defined, identified, or otherwise received. Access to the one or more interfaces in the parent bean factory can be restricted to the child bean factories. In another aspect, one or more entity aware components in the child bean factory are defined, identified, or otherwise received. Access to the entity aware components can be shared based on only loading each entity aware component once per entity. In yet another aspect, one or more shared components in the parent bean factory can be define, identified, or otherwise received. Access to the shared components can be shared based on only loading each shared component once per application instance.

In one embodiment, a non-transitory computer-readable medium stores a computer program product which when executed by a processor of a computer systems causes the processor to receive a hierarchical bean factory associated with an application, a parent bean factory representing a shared application context and each child bean factory representing an entity specific application context; receive a request to invoke a function associated with the application; determine an entity based on the request; determine a child bean factory in the hierarchical bean factory that is associated with the entity; and cause the function associated with the application to be invoked using the child bean factory specific to the entity.

In another embodiment, a system includes at least one processor and a memory storing a computer program product which when executed by the processor causes the processor to receive a hierarchical bean factory associated with an application, a parent bean factory representing a shared application context and each child bean factory representing an entity specific application context; receive a request to invoke a function associated with the application; determine an entity based on the request; determine a child bean factory in the hierarchical bean factory that is associated with the entity; and cause the function associated with the application to be invoked using the child bean factory specific to the entity.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF THE DRAWINGS

Illustrative embodiments of the present invention are described in detail below with reference to the following drawing figures.

DETAILED DESCRIPTION

Figure 1A:
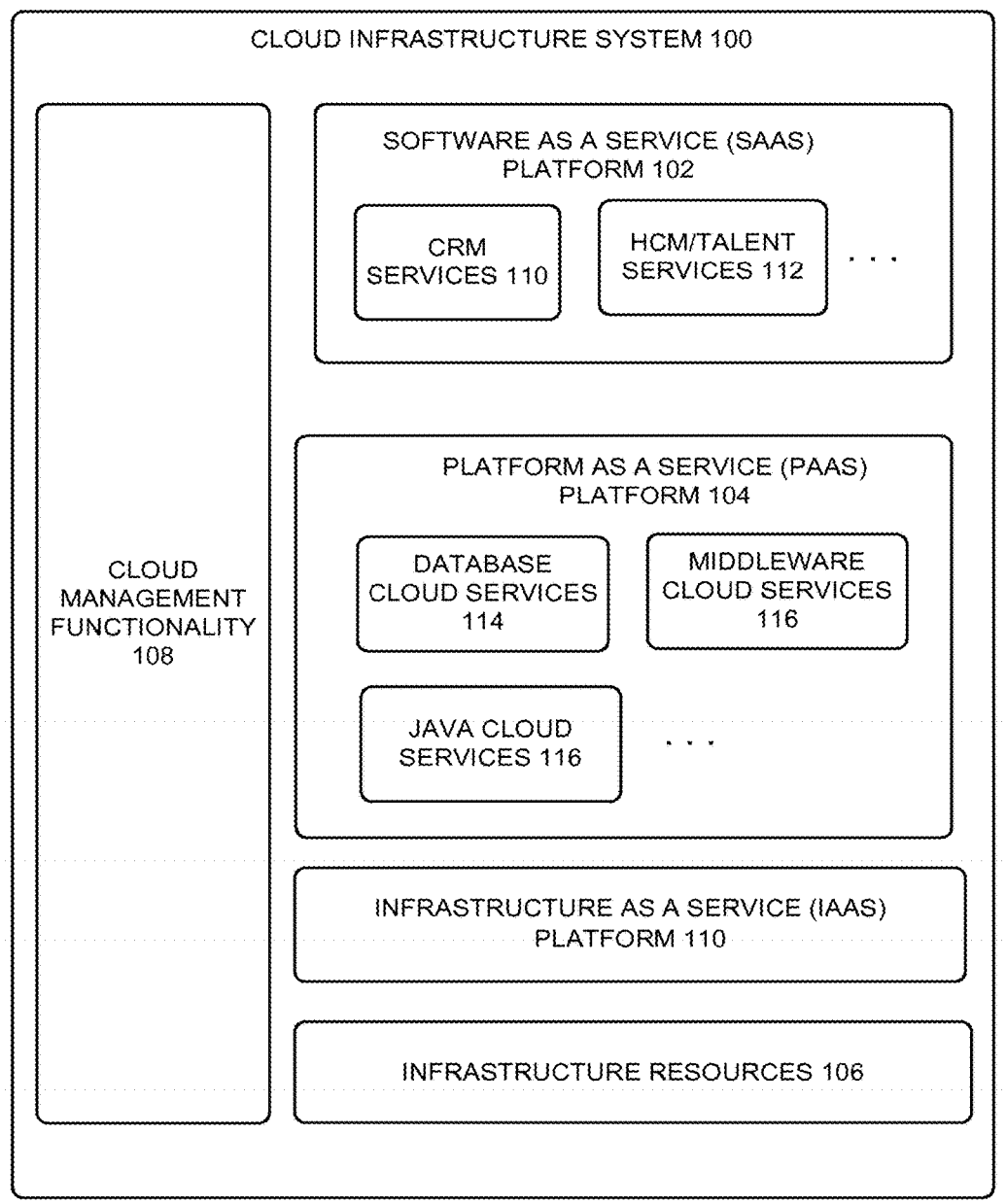
FIG. 1A is a logical view of a cloud infrastructure system according to one embodiment of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

Certain embodiments of the present invention provide techniques for automating the provisioning, managing and tracking of services provided by a cloud infrastructure system.

Introduction

In certain embodiments, a cloud infrastructure system may include a suite of applications, middleware and database service offerings that are delivered to a customer in a self-service, subscription-based, elastically scalable, reliable, highly available, and secure manner. An example of such a cloud infrastructure system is the Oracle Public Cloud provided by the present assignee.

A cloud infrastructure system may provide many capabilities including, but not limited to, provisioning, managing and tracking a customer's subscription for services and resources in the cloud infrastructure system, providing predictable operating expenses to customers utilizing the services in the cloud infrastructure system, providing robust identity domain separation and protection of a customer's data in the cloud infrastructure system, providing customers with a transparent architecture and control of the design of the cloud infrastructure system, providing customers assured data protection and compliance with data privacy standards and regulations, providing customers with an integrated development experience for building and deploying services in the cloud infrastructure system and providing customers with a seamless integration between business software, middleware, database and infrastructure services in the cloud infrastructure system.

In certain embodiments, services provided by the cloud infrastructure system may include a host of services that are made available to users of the cloud infrastructure system on demand such as online data storage and backup solutions, Web-based e-mail services, hosted office suites and document collaboration services, database processing, managed technical support services and the like. Services provided by the cloud infrastructure system can dynamically scale to meet the needs of its users. A specific instantiation of a service provided by cloud infrastructure system is referred to herein as a service instance. In general, any service made available to a user via a communication network such as the Internet from a cloud service provider's system is referred to as a cloud service. Typically, in a public cloud environment, servers and systems that make up the cloud service provider's system are different from the customer's own on-premises servers and systems. For example, a cloud service provider's system may host an application and a user may, via a communication network such as the Internet, on demand, order and use the application.

A service in a computer network cloud infrastructure includes protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and script-language middleware engine for private use by a networked developer. As another example, a service can include access to an email software application hosted on a cloud vendor's web site.

FIG. 1A is a logical view of a cloud infrastructure system according to one embodiment of the present invention. Cloud infrastructure system 100 may provide a variety of services via a cloud or networked environment. These services may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 100. Cloud infrastructure system 100 then performs processing to provide the services in the customer's subscription order.

Cloud infrastructure system 100 may provide the cloud services via different deployment models. For example, services may be provided under a public cloud model where cloud infrastructure system 100 is owned by an organization selling cloud services (e.g., owned by Oracle) and the services are made available to the general public or different industry enterprises. As another example, services may be provided under a private cloud model where cloud infrastructure system 100 is operated solely for a single organization and may provide services for one or more entities within the organization. The cloud services may also be provided under a community cloud model where cloud infrastructure system 100 and the services provided by system 100 are shared by several organizations in a related community. The cloud services may also be provided under a hybrid cloud model, which is a combination of two or more different models.

As shown in FIG. 1A, cloud infrastructure system 100 may comprise multiple components, which working in conjunction, enable provision of services provided by cloud infrastructure system 100. In the embodiment illustrated in FIG. 1A, cloud infrastructure system 100 includes a SaaS platform 102, a PaaS platform 104, an IaaS platform 110, infrastructure resources 106, and cloud management functionality 108. These components may be implemented in hardware, or software, or combinations thereof.

SaaS platform 102 is configured to provide cloud services that fall under the SaaS category. For example, SaaS platform 102 may provide capabilities to build and deliver a suite of on-demand applications on an integrated development and deployment platform. SaaS platform 102 may manage and control the underlying software and infrastructure for providing the SaaS services. By utilizing the services provided by SaaS platform 102, customers can utilize applications executing on cloud infrastructure system 100. Customers can acquire the application services without the need for customers to purchase separate licenses and support.

Various different SaaS services may be provided. Examples include without limitation services that provide solutions for sales performance management, enterprise integration and business flexibility for large organizations, and the like. In one embodiment, the SaaS services may include Customer Relationship Management (CRM) services 110 (e.g., Fusion CRM services provided by the Oracle cloud), Human Capital Management (HCM)/Talent Management services 112, and the like. CRM services 110 may include services directed to reporting and management of a sales activity cycle to a customer, and others. HCM/Talent services 112 may include services directed to providing global workforce lifecycle management and talent management services to a customer.

Various different PaaS services may be provided by PaaS platform 104 in a standardized, shared and elastically scalable application development and deployment platform. Examples of PaaS services may include without limitation services that enable organizations (such as Oracle) to consolidate existing applications on a shared, common architecture, as well as the ability to build new applications that leverage the shared services provided by the platform. PaaS platform 104 may manage and control the underlying software and infrastructure for providing the PaaS services. Customers can acquire the PaaS services provided by cloud infrastructure system 100 without the need for customers to purchase separate licenses and support. Examples of PaaS services include without limitation Oracle Java Cloud Service (JCS), Oracle Database Cloud Service (DBCS), and others.

By utilizing the services provided by PaaS platform 104, customers can utilize programming languages and tools supported by cloud infrastructure system 100 and also control the deployed services. In some embodiments, PaaS services provided by the cloud infrastructure system 100 may include database cloud services 114, middleware cloud services (e.g., Oracle Fusion Middleware services) 116 and Java cloud services 117. In one embodiment, database cloud services 114 may support shared service deployment models that enable organizations to pool database resources and offer customers a database-as-a-service in the form of a database cloud, middleware cloud services 116 provides a platform for customers to develop and deploy various business applications and Java cloud services 117 provides a platform for customers to deploy Java applications, in the cloud infrastructure system 100. The components in SaaS platform 102 and PaaS platform 104 illustrated in FIG. 1A are meant for illustrative purposes only and are not intended to limit the scope of embodiments of the present invention. In alternate embodiments, SaaS platform 102 and PaaS platform 104 may include additional components for providing additional services to the customers of cloud infrastructure system 100.

Various different IaaS services may be provided by IaaS platform 110. The IaaS services facilitate the management and control of the underlying computing resources such as storage, networks, and other fundamental computing resources for customers utilizing services provided by the SaaS platform and the PaaS platform.

In certain embodiments, cloud infrastructure system 100 includes infrastructure resources 106 for providing the resources used to provide various services to customers of the cloud infrastructure system 100. In one embodiment, infrastructure resources 106 includes pre-integrated and optimized combinations of hardware such as servers, storage and networking resources to execute the services provided by the PaaS platform and the SaaS platform.

In certain embodiments, cloud management functionality 108 provides comprehensive management of cloud services (e.g., SaaS, PaaS, IaaS services) in the cloud infrastructure system 100. In one embodiment, cloud management functionality 108 includes capabilities for provisioning, managing and tracking a customer's subscription received by the cloud infrastructure system 100, and the like.

Figure 1B:
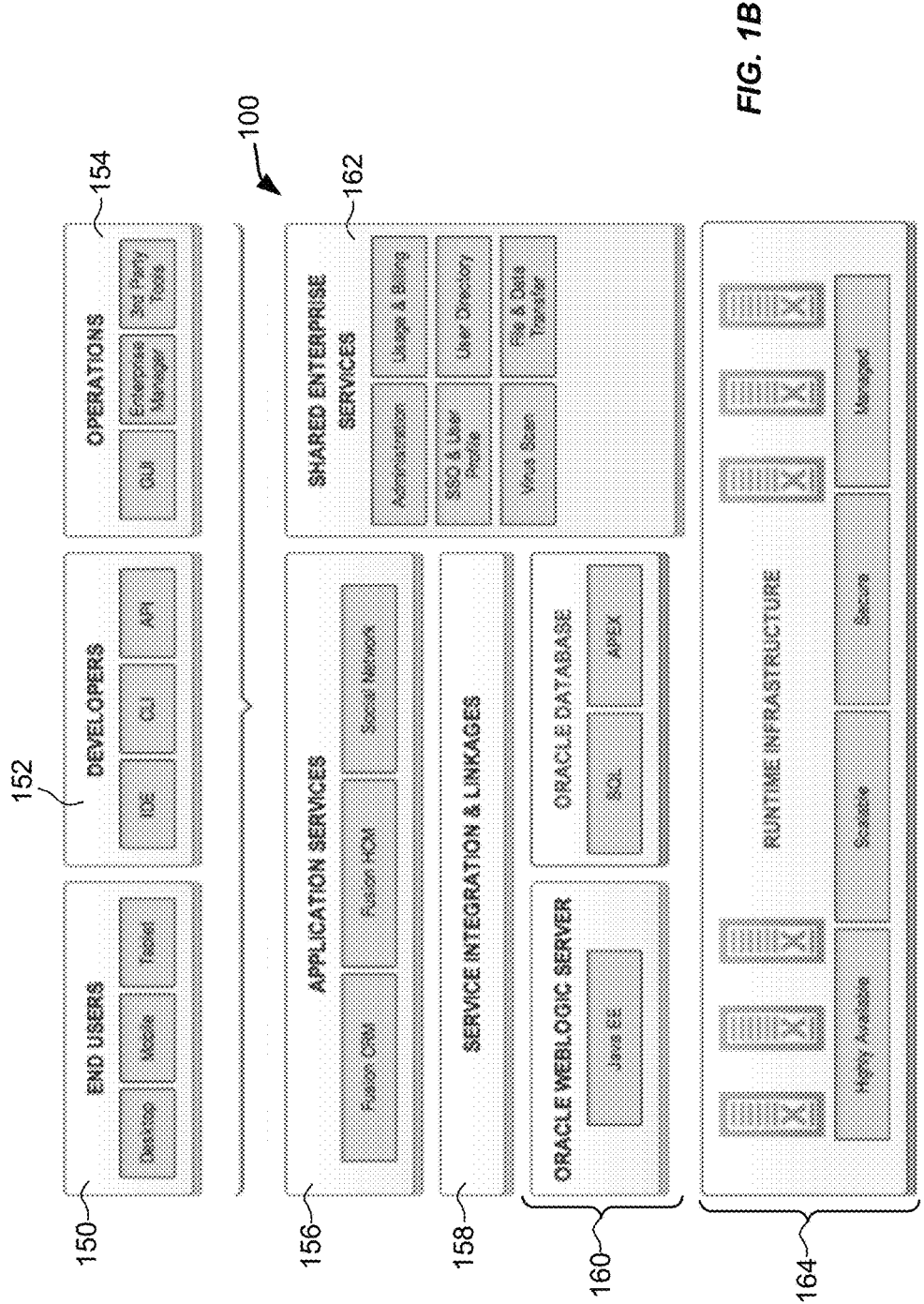
FIG. 1B is a simplified block diagram of a hardware/software stack that may be used to implement a cloud infrastructure system according to an embodiment of the present invention.

FIG. 1B is a simplified block diagram of a hardware/software stack that may be used to implement cloud infrastructure system 100 according to an embodiment of the present invention. It should be appreciated that implementation depicted in FIG. 1B may have other components than those depicted in FIG. 1B. Further, the embodiment shown in FIG. 1B is only one example of a cloud infrastructure system that may incorporate an embodiment of the invention. In some other embodiments, cloud infrastructure system 100 may have more or fewer components than shown in FIG. 1B, may combine two or more components, or may have a different configuration or arrangement of components. In certain embodiments, the hardware and software components are stacked so as to provide vertical integration that provides optimal performance.

Various types of users may interact with cloud infrastructure system 100. These users may include, for example, end users 150 that can interact with cloud infrastructure system 100 using various client devices such as desktops, mobile devices, tablets, and the like. The users may also include developers/programmers 152 who may interact with cloud infrastructure system 100 using command line interfaces (CLIs), application programming interfaces (APIs), through various integrated development environments (IDEs), and via other applications. User may also include operations personnel 154. These may include personnel of the cloud service provider or personnel of other users.

Application services layer 156 identifies various cloud services that may be offered by cloud infrastructure system 100. These services may be mapped to or associated with respective software components 160 (e.g., Oracle WebLogic server for providing Java services, oracle database for providing database services, and the like) via a service integration and linkages layer 158.

In certain embodiments, a number of internal services 162 may be provided that are shared by different components or modules of cloud infrastructure system 100 and by the services provided by cloud infrastructure system 100. These internal shared services may include, without limitation, a security and identity service, an integration service, an enterprise repository service, an enterprise manager service, a virus scanning and white list service, a high availability, backup and recovery service, service for enabling cloud support in IDEs, an email service, a notification service, a file transfer service, and the like.

Runtime infrastructure layer 164 represents the hardware layer on which the various other layers and components are built. In certain embodiments, runtime infrastructure layer 164 may comprise one Oracle's Exadata machines for providing storage, processing, and networking resources. An Exadata machine may be composed of various database servers, storage Servers, networking resources, and other components for hosting cloud-services related software layers. In certain embodiments, the Exadata machines may be designed to work with Oracle Exalogic, which is an engineered system providing an assemblage of storage, compute, network, and software resources. The combination of Exadata and Exalogic provides a complete hardware and software engineered solution that delivers high-performance, highly available, scalable, secure, and a managed platform for providing cloud services.

Figure 2:
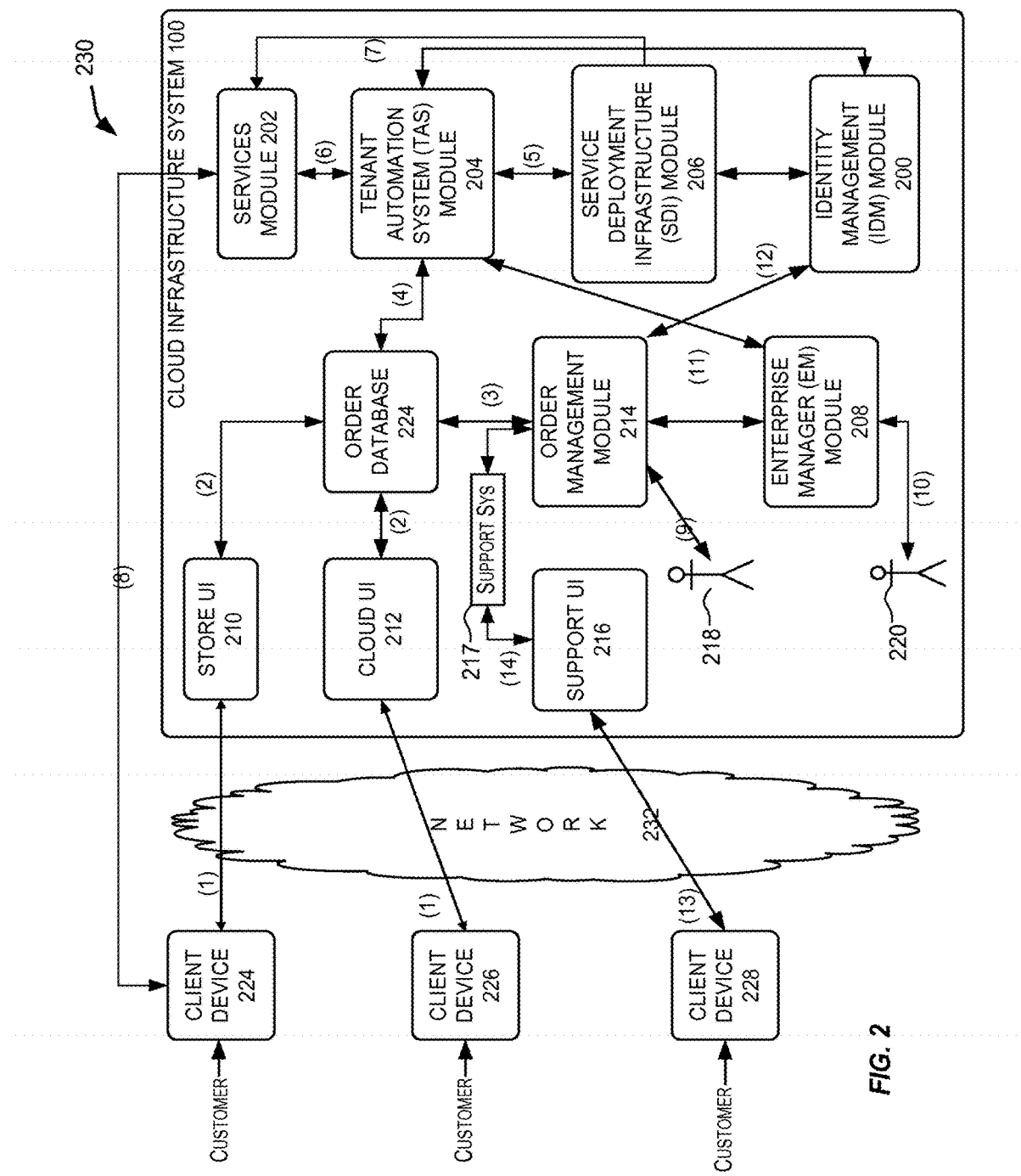
FIG. 2 is a simplified block diagram of a system environment for implementing the cloud infrastructure system shown in FIG. 1A.

FIG. 2 is a simplified block diagram of a system environment for implementing the cloud infrastructure system shown in FIG. 1A according to an embodiment of the present invention. In the illustrated embodiment, system environment 230 includes one or more client computing devices 224, 226 and 228 that may be used by users to interact with cloud infrastructure system 100. A client device may be configured to operate a client application such as a web browser, a proprietary client application (e.g., Oracle Forms), or some other application, which may be used by a user of the client device to interact with cloud infrastructure system 100 to utilize services provided by cloud infrastructure system 100.

It should be appreciated that cloud infrastructure system 100 depicted in FIG. 2 may have other components than those depicted in FIG. 2. Further, the embodiment shown in FIG. 2 is only one example of a cloud infrastructure system that may incorporate an embodiment of the invention. In some other embodiments, cloud infrastructure system 100 may have more or fewer components than shown in FIG. 2, may combine two or more components, or may have a different configuration or arrangement of components.

Client computing devices 224, 226 and 228 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), workstation computers running any of a variety of commercially-available UNIX or UNIX-like operating systems (including without limitation the variety of GNU/Linux operating systems), or any other computing device. For example, client computing devices 224, 226 and 228 may be any other electronic device, such as a thin-client computer, Internet-enabled gaming system, and/or personal messaging device, capable of communicating over a network (e.g., network 232 described below). Although exemplary system environment 230 is shown with three client computing devices, any number of client computing devices may be supported. Other devices such as devices with sensors, etc. may interact with cloud infrastructure system 100.

A network 232 may facilitate communications and exchange of data between clients 224, 226 and 228 and cloud infrastructure system 100. Network 232 may be any type of network familiar to those skilled in the art that can support data communications using any of a variety of commercially-available protocols, including without limitation TCP/IP, SNA, IPX, AppleTalk, and the like. Merely by way of example, network 232 can be a local area network (LAN) such as an Ethernet network, a Token-Ring network and/or the like, a wide-area network, a virtual network, including without limitation a virtual private network (VPN), the Internet, an intranet, an extranet, a public switched telephone network (PSTN), an infra-red network, a wireless network (e.g., a network operating under any of the IEEE 802.1X suite of protocols, the Bluetooth protocol known in the art, and/or any other wireless protocol), and/or any combination of these and/or other networks.

Cloud infrastructure system 100 may comprise one or more computers and/or servers which may be general purpose computers, specialized server computers (including, by way of example, PC servers, UNIX servers, mid-range servers, mainframe computers, rack-mounted servers, etc.), server farms, server clusters, or any other appropriate arrangement and/or combination. The computing devices that make up cloud infrastructure system 100 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

In various embodiments, cloud infrastructure system 100 may be adapted to automatically provision, manage and track a customer's subscription to services offered by cloud infrastructure system 100. In one embodiment, as depicted in FIG. 2, the components in cloud infrastructure system 100 include an Identity Management (IDM) module 200, a services module 202, a Tenant Automation System (TAS) module 204, a Service Deployment Infrastructure (SDI) module 206, an Enterprise Manager (EM) module 208, one or more front-end web interfaces such as a store user interface (UI) 210, a cloud user interface (UI) 212, and a support user interface (UI) 216, an order management module 214, sales personnel 218, operator personnel 220 and an order database 224. These modules may include or be provided using one or more computers and/or servers which may be general purpose computers, specialized server computers, server farms, server clusters, or any other appropriate arrangement and/or combination. In one embodiment, one or more of these modules can be provided by cloud management functionality 108 or IaaS platform 110 in cloud infrastructure system 100. The various modules of the cloud infrastructure system 100 depicted in FIG. 2 are meant for illustrative purposes only and are not intended to limit the scope of embodiments of the present invention. Alternative embodiments may include more or fewer modules than those shown in FIG. 2.

In an exemplary operation, at (1) a customer using a client device such as client device 224 or 226 may interact with cloud infrastructure system 100 by browsing the various services provided by cloud infrastructure system 100 and placing an order for a subscription for one or more services offered by cloud infrastructure system 100. In certain embodiments, the customer may access store UI 210 or cloud UI 212 and place a subscription order via these user interfaces.

The order information received by cloud infrastructure system 100 in response to the customer placing an order may include information identifying the customer and one or more services offered by the cloud infrastructure system 100 that the customer intends to subscribe to. A single order may include orders for multiple services. For instance, a customer may login to cloud UI 212 and request a subscription for a CRM service and a Java cloud service in the same order.

Additionally, the order may also include one or more service levels for the ordered services. As used herein, and as will be discussed in greater detail below, a service level for a service determines the amount of resources to be allocated for providing the requested service in the context of the subscription, such as the amount of storage, amount of computing resources, data transfer facilities, and the like. For example, a basic service level may provide a minimum level of storage, data transmission, or number of users, and higher service levels may include additional resources.

In addition, in some instances, the order information received by cloud infrastructure system 100 may include information indicative of a customer level, and the time period during which the service is desired. The customer level specifies the priority of the customer making the subscription request. In one example, the priority may be determined based on the quality of service that the cloud infrastructure system 100 guarantees or promises the customer as specified by a Service Level Agreement (SLA) agreed to between the customer and the provider of the cloud services. In one example, the different customer levels include a basic level, a silver level and a gold level. The time period for a service may specify the start date and time for the service and the time period for which the service is desired (e.g., a service end date and time may be specified).

In one embodiment, a customer may request a new subscription via store UI 210 or request for a trial subscription via cloud UI 212. In certain embodiments, store UI 210 may represent the service provider's eCommerce store front (e.g., www.oracle.com/store for Oracle Cloud services). Cloud UI 212 may represent a business interface for the service provider. Consumer can explore available services and sign up for interested services through cloud UI 212. Cloud UI 212 captures user input necessary for ordering trial subscriptions provided by cloud infrastructure system 100. Cloud UI 212 may also be used to view account features and configure the runtime environment located within cloud infrastructure system 100. In addition to placing an order for a new subscription, store UI 210 may also enable the customer to perform other subscription-related tasks such as changing the service level of a subscription, extending the term of the subscription, increasing the service level of a subscription, terminating an existing subscription, and the like.

After an order has been placed per (1), at (2), the order information that is received via either store UI 210 or cloud UI 212 is stored in order database 224, which can be one of several databases operated by cloud infrastructure system 100 and utilized in conjunction with other system elements. While order database 224 is shown logically as a single database in FIG. 2, in actual implementation, this may comprise one or more databases.

At (3), the order is forwarded to order management module 214. Order management module 214 is configured to perform billing and accounting functions related to the order such as verifying the order and upon verification, booking the order. In certain embodiments, order management module 214 may include a contract management module and an install base module. The contract management module may store contract information associated with the customer's subscription order such as the customer's service level agreement (SLA) with cloud infrastructure system 100. The install base module may include detailed descriptions of the services in the customer's subscription order. In addition to order information, the install base module may track installation details related to the services, product status and support service history related to the services. As a customer orders new services or upgrades existing ones, the install base module may automatically add new order information.

At (4), information regarding the order is communicated to TAS module 204. In one embodiment, TAS module 204 utilizes the order information to orchestrate the provisioning of services and resources for the order placed by the customer. At (5), TAS component 204 orchestrates the provisioning of resources to support the subscribed services using the services of SDI module 206. At (6) TAS module 204 provides information related to the provisioned order received from SDI module 206 to services module 202. In some embodiments, at (7), SDI module 206 may also use services provided by services module 202 to allocate and configure the resources needed to fulfill the customer's subscription order.

At (8), services module 202 sends a notification to the customers on client devices 224, 226 and 228 regarding the status of the order.

In certain embodiments, TAS module 204 functions as an orchestration component that manages business processes associated with each order and applies business logic to determine whether an order should proceed to provisioning. In one embodiment, upon receiving an order for a new subscription, TAS module 204 sends a request to SDI module 206 to allocate resources and configure those resources needed to fulfill the subscription order. SDI module 206 enables the allocation of resources for the services ordered by the customer. SDI module 206 provides a level of abstraction between the cloud services provided by cloud infrastructure system 100 and the physical implementation layer that is used to provision the resources for providing the requested services. TAS module 204 may thus be isolated from implementation details such as whether or not services and resources are actually provisioned on the fly or pre-provisioned and only allocated/assigned upon request.

In certain embodiments, a user may use store UI 210 to directly interact with order management module 214 to perform billing and accounting related functions such as verifying the order and upon verification, booking the order. In some embodiments, instead of a customer placing an order, at (9), the order may instead be placed by sales personnel 218 on behalf of the customer such as a customer's service representative or sales representative. Sales personnel 218 may directly interact with order management module 214 via a user interface (not shown in FIG. 2) provided by order management module 214 for placing orders or for providing quotes for the customer. This, for example, may be done for large customers where the order may be placed by the customer's sales representative through order management module 214. The sales representative may set up the subscription on behalf of the customer.

EM module 208 is configured to monitor activities related to managing and tracking a customer's subscription in cloud infrastructure system 100. EM module 208 collects usage statistics for the services in the subscription order such as the amount of storage used, the amount data transferred, the number of users, and the amount of system up time and system down time. At (10), a host operator personnel 220, who may be an employee of a provider of cloud infrastructure system 100, may interact with EM module 208 via an enterprise manager user interface (not shown in FIG. 2) to manage systems and resources on which services are provisioned within cloud infrastructure system 100.

Identity management (IDM) module 200 is configured to provide identity services such as access management and authorization services in cloud infrastructure system 100. In one embodiment, IDM module 200 controls information about customers who wish to utilize the services provided by cloud infrastructure system 100. Such information can include information that authenticates the identities of such customers and information that describes which actions those customers are authorized to perform relative to various system resources (e.g., files, directories, applications, communication ports, memory segments, etc.) IDM module 200 can also include the management of descriptive information about each customer and about how and by whom that descriptive information can be accessed and modified.

In one embodiment, information managed by the identity management module 200 can be partitioned to create separate identity domains. Information belonging to a particular identity domain can be isolated from all other identity domains. Also, an identity domain can be shared by multiple separate tenants. Each such tenant can be a customer subscribing to services in the cloud infrastructure system 100. In some embodiments, a customer can have one or many identity domains, and each identity domain may be associated with one or more subscriptions, each subscription having one or many services. For example, a single customer can represent a large entity and identity domains may be created for divisions/departments within this large entity. EM module 208 and IDM module 200 may in turn interact with order management module 214 at (11) and (12) respectively to manage and track the customer's subscriptions in cloud infrastructure system 100.

In one embodiment, at (13), support services may also be provided to the customer via a support UI 216. In one embodiment, support UI 216 enables support personnel to interact with order management module 214 via a support backend system to perform support services at (14). Support personnel in the cloud infrastructure system 100 as well as customers can submit bug reports and check the status of these reports via support UI 216.

Other interfaces, not shown in FIG. 2 may also be provided by cloud infrastructure system 100. For example, an identity domain administrator may use a user interface to IDM module 200 to configure domain and user identities. In addition, customers may log into a separate interface for each service they wish to utilize. In certain embodiments, a customer who wishes to subscribe to one or more services offered by cloud infrastructure system 100 may also be assigned various roles and responsibilities. In one embodiment, the different roles and responsibilities that may be assigned for a customer may include that of a buyer, an account administrator, a service administrator, an identity domain administrator or a user who utilizes the services and resources offered by cloud infrastructure system 100. The different roles and responsibilities are described more fully in FIG. 4 below.

Figure 3A:
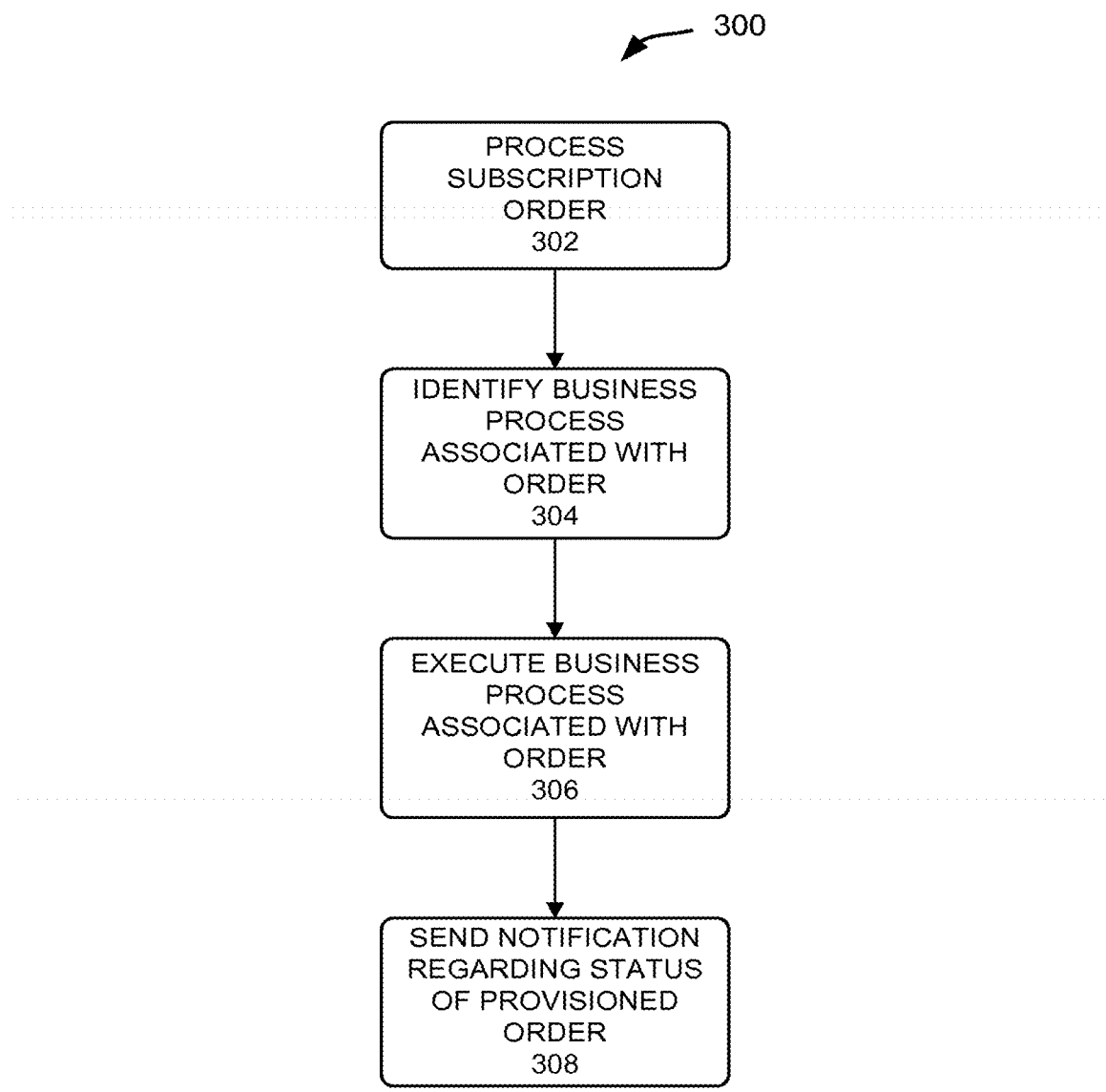
FIG. 3A depicts a simplified flowchart 300 depicting processing that may be performed by the TAS module in the cloud infrastructure system, in accordance with an embodiment of the present invention.

FIG. 3A depicts a simplified flowchart 300 depicting processing that may be performed by the TAS module in the cloud infrastructure system, in accordance with an embodiment of the present invention. The processing depicted in FIG. 3A may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 3A is not intended to be limiting. Other sequences of steps may also be performed according to alternative embodiments. For example, alternative embodiments of the present invention may perform the steps outlined above in a different order. Moreover, the individual steps illustrated in FIG. 3A may include multiple sub-steps that may be performed in various sequences as appropriate to the individual step. Furthermore, additional steps may be added or removed depending on the particular applications. One of ordinary skill in the art would recognize many variations, modifications, and alternatives. In one embodiment, the processing depicted in FIG. 3A may be performed by one or more components in TAS component 204 as will be described in detail in FIG. 3B.

At 302, a customer's subscription order is processed. The processing may include validating the order, in one example. Validating the order includes ensuring that the customer has paid for the subscription and ensuring that the customer does not already have subscriptions with the same name or that the customer is not attempting to create multiple subscriptions of the same type in the same identity domain for subscription types for which this is disallowed (such as, in the case of a CRM service). Processing may also include tracking the status of an order for each order that is being processed by cloud infrastructure system 100.

At 304, a business process associated with the order is identified. In some instances, multiple business processes may be identified for an order. Each business process identifies a series of steps for processing various aspects of the order. As an example, a first business process may identify one or more steps related to provisioning physical resources for the order, a second business process may identify one or more steps related to creating an identity domain along with customer identities for the order, a third business process may identify one or more steps for related to performing back office functions such as creating a customer record for the user, performing accounting functions related to the order, and the like. In certain embodiments, different business processes may also be identified for processing different services in an order. For example, different business process may be identified to process a CRM service and a database service.

At 306, the business process identified for the order in 304 is executed. Executing the business process associated with the order may include orchestrating the series of steps associated with the business process identified in step 304. For example, executing a business process related to provisioning physical resources for the order may include sending a request to SDI module 206 to allocate resources and configure those resources needed to fulfill the subscription order.

At 308, a notification is sent to the customer regarding the status of the provisioned order. Additional description related to performing steps 302, 304, 306 and 308 is provided in detail in FIG. 3B.

Figure 3B:
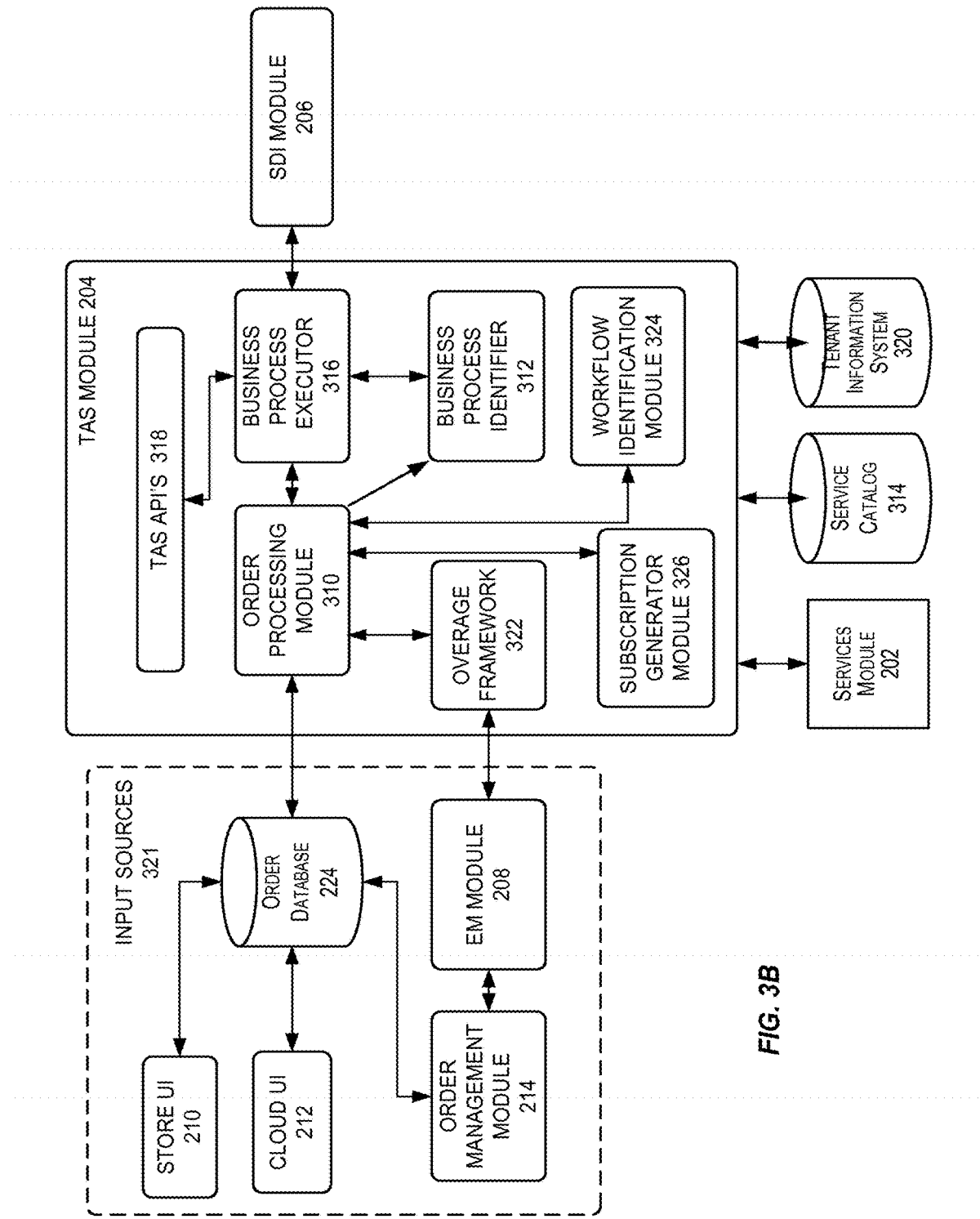
FIG. 3B depicts a simplified high level diagram of one or more sub-modules in the TAS module in the cloud infrastructure system, in accordance with an embodiment of the present invention.

FIG. 3B depicts a simplified high level diagram of one or more sub-modules in the TAS module in the cloud infrastructure system, in accordance with an embodiment of the present invention. In one embodiment, the modules depicted in FIG. 3B perform the processing described in steps 302-308 discussed in FIG. 3A. In the illustrated embodiment, TAS module 204 comprises an order processing module 310, a business process identifier 312, a business process executor 316, an overage framework 322, a workflow identification module 324, and a bundled subscription generator module 326. These modules may be implemented in hardware, or software, or combinations thereof. The various modules of the TAS module depicted in FIG. 3B are meant for illustrative purposes only and are not intended to limit the scope of embodiments of the present invention. Alternative embodiments may include more or fewer modules than those shown in FIG. 3B.

In one embodiment, order processing module 310 receives an order from a customer from one or more input sources 321. For example, order processing module 310 may directly receive an order via cloud UI 212 or store UI 210, in one embodiment. Alternatively, order processing module 310 may receive an order from order management module 214 or order database 224. Order processing module 310 then processes the order. In certain embodiments, processing the order includes generating a customer record which includes information about the order such as a service type, a service level, a customer level, the type of resources, the amount of the resources to be allocated to the service instance and a time period during which the service is desired. As part of the processing, order processing module 310 also determines whether the order is a valid order. This includes ensuring that the customer does not already have subscriptions with the same name or that the customer is not attempting to create multiple subscriptions of the same type in the same identity domain for subscription types where this is disallowed (such as, in the case of a fusion CRM service).

Order processing module 310 may also perform additional processing on the order. Processing may include tracking the status of an order for each order that is being processed by cloud infrastructure system 100. In one embodiment, order processing module 310 may process each order to identify a number of states pertaining to the order. In one example, the different states of an order may be an initialized state, a provisioned state, an active state, an administration required state, an error state, and the like. An initialized state refers to the state of a new order; a provisioned state refers to the state of an order once the services and resources for the order have been provisioned. An order is in an active state when the order has been processed by TAS module 204 and a notification to that effect has been delivered to the customer. An order is in an administration required state when intervention by an administrator is needed to resolve the issue. The order is in an error state when the order cannot be processed. In addition to maintaining the order progress status, order processing module 310 also maintains detailed information about any failures encountered during process execution. In other embodiments, and as will be discussed in detail below, the additional processing performed by order processing module 310 may also include changing the service level for a service in the subscription, changing the services included in the subscription, extending the time period of the subscription, and canceling the subscription or specifying different service levels for different time periods in the subscription.

After an order has been processed by order processing module 310, business logic is applied to determine whether the order should proceed to provisioning. In one embodiment, as part of orchestrating the order, business process identifier 312 receives the processed order from order processing module 310 and applies business logic to identify a particular business process to use for the order being processed. In one embodiment, business process identifier 312 may utilize information stored in a service catalog 314 to determine the particular business process to be used for the order. In one embodiment, and as discussed in FIG. 3A, multiple business processes may be identified for an order and each business process identifies a series of steps for processing various aspects of the order. In another embodiment, and as discussed above, different business processes may be defined for different types of services, or combinations of services such as a CRM service or a database service. In one embodiment, service catalog 314 may store information mapping an order to a particular type of business process. Business process identifier 312 may use this information to identify a specific business process for the order being processed.

Once a business process has been identified, business process identifier 312 communicates the particular business process to be executed to business process executor 316. Business process executor 316 then executes steps of the identified business process by operating in conjunction with one or more modules in the cloud infrastructure system 100. In some embodiments, business process executor 316 acts as an orchestrator for performing the steps associated with a business process. For example, the business process executor may interact with order processing module 310 to execute steps in a business process that identifies workflows related to the order, determines the overage of services in the order or identifies service components related to the order.

In one example, business process executor 316 interacts with SDI module 206 to execute steps in a business process for allocating and provisioning resources for services requested in the subscription order. In this example, for each step in the business process, business process executor 316 may send a request to SDI component 206 to allocate resources and configure resources needed to fulfill the particular step. SDI component 206 is responsible for the actual allocation of the resources. Once all the steps of the business processes of an order have been executed, business process executor 316 may send a notification to the customer of the processed order by utilizing the services of services component 202. The notification may include sending an email notification to the customer with details of the processed order. The email notification may also include deployment information related to the order to enable the customer to access the subscribed services.

In certain embodiments, TAS module 204 may provide one or more TAS Application Programming Interfaces (APIs) 318 that enable TAS module 204 to interact with other modules in cloud infrastructure system 100 and for other modules to interact with TAS module 204. For example, the TAS APIs may include a system provisioning API that interacts with SDI module 206 via an asynchronous Simple Object Access Protocol (SOAP) based web services call to provision resources for the customer's subscription order. In one embodiment, TAS module 204 may also utilize the system provisioning API to accomplish system and service instance creation and deletion, switch a service instance to an increased service level, and associate service instances. An example of this is the association of a Java service instance to a fusion applications service instance to allow secure web service communications. The TAS APIs may also include a notification API that interacts with the services module 202 to notify the customer of a processed order. In certain embodiments, the TAS module 204 also periodically propagates subscription information, outages, and notifications (e.g. planned downtime) to services component 202.

In certain embodiments, TAS module 204 periodically receives usage statistics for each of the provisioned services such as the amount of storage used, the amount data transferred, the number of users, and the amount of system up time and system down time from EM module 208. Overage framework 322 utilizes the usage statistics to determine whether over use of a service has occurred, and if so, to determine how much to bill for the overage, and provides this information to order management module 214.

In certain embodiments, TAS module 204 includes an order workflow identification module 324 that is configured to identify one or more workflows associated with processing a customer's subscription order. In certain embodiments, TAS module 204 may include a subscription order generation framework 326 for generating subscription orders for a customer when the customer places a subscription order for one or more services offered by the cloud infrastructure system 100. In one embodiment, a subscription order includes one or more service components responsible for providing the services requested by a customer in the subscription order.

Additionally, TAS module 204 may also interact with one or more additional databases such as a Tenant Information System (TIS) database 320 to enable the provisioning of resources for one or more services subscribed by the customer while taking into consideration historical information, if any, available for the customer. TIS database 320 may include historical order information and historical usage information pertaining to orders subscribed by the customer.

TAS module 204 may be deployed using different deployment models. In certain embodiments, the deployment includes a central component that interfaces with one or more distributed components. The distributed components may, for example, be deployed as various data centers and accordingly may also be referred to as data center components. The central component includes capabilities to process orders and co-ordinate services in cloud infrastructure system 100, while the data center components provide capabilities for provisioning and operating the runtime system that provides the resources for the subscribed services.

Figure 4:
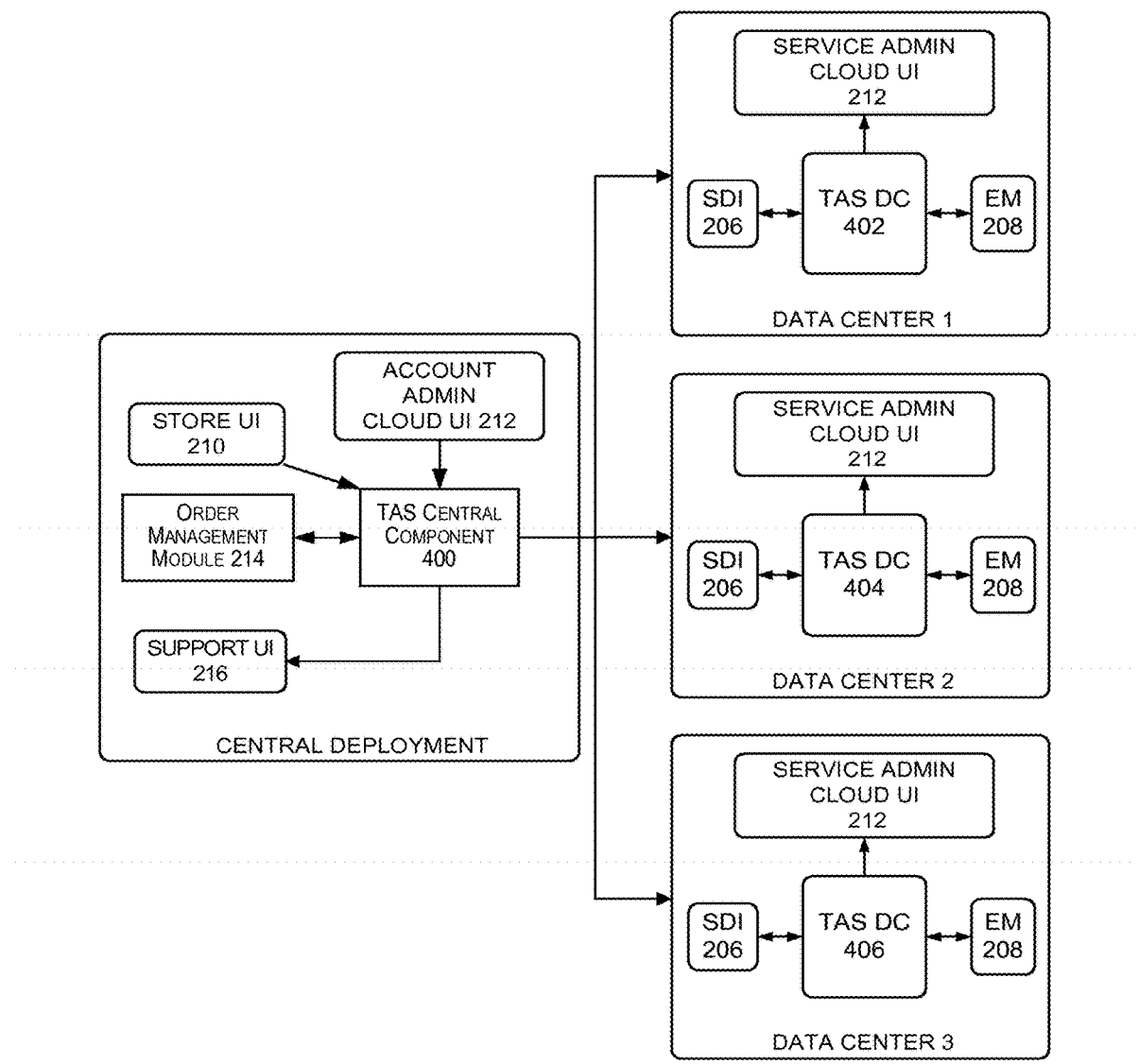
FIG. 4 depicts an exemplary distributed deployment of the TAS component, according to an embodiment of the present invention.

FIG. 4 depicts an exemplary distributed deployment of the TAS module, according to an embodiment of the present invention. In the embodiment depicted in FIG. 4, the distributed deployment of TAS module 204 includes a TAS central component 400 and one or more TAS Data Centers (DCs) components 402, 404 and 406. These components may be implemented in hardware, or software, or combinations thereof.

In one embodiment, the responsibilities of TAS central component 400 include, without limitation, to provide a centralized component for receiving customer orders, performing order-related business operations such as creating a new subscription, changing the service level for a service in the subscription, changing the services included in the subscription, and extending the time period of the subscription, or canceling the subscription. The responsibilities of TAS central component 400 may also include maintaining and serving subscription data needed by cloud infrastructure system 100 and interfacing with order management module 214, support UI 216, cloud UI 212 and store UI 210 to handle all the back-office interactions.

In one embodiment, the responsibilities of TAS DCs 402, 404 and 406 include, without limitation, performing runtime operations for orchestrating the provisioning the resources for one or more services subscribed by the customer. TAS DCs 402, 404 and 406 also include capabilities to perform operations such as locking, unlocking, enabling, or disabling a subscription order, collecting metrics related to the order, determining the status of the order, and sending notification events related to the order.

In an exemplary operation of the distributed TAS system shown in FIG. 4, TAS central component 400 initially receives an order from a customer via cloud UI 212, store UI 210, via order management system 214, or via order database 224. In one embodiment, the customer represents a buyer who has financial information and the authority to order and/or change a subscription. In one embodiment, the order information includes information identifying the customer, the type of services that the customer wishes to subscribe to, and an account administrator who will be responsible for handling the request. In certain embodiments, the account administrator may be nominated by the customer when the customer places an order for a subscription to one or more services offered by cloud infrastructure system 100. Based on the order information, the TAS central component 400 identifies the data region of the world such as Americas, EMEA, or Asia Pacific in which the order originates and the particular TAS DCs (for e.g., 402, 404 or 406) that will be deployed for provisioning the order. In one embodiment, the particular TAS DC (for e.g., from among DCs 402, 404 or 406) that will be deployed for provisioning the order is determined based on the geographical data region in which the request originated.

TAS central component 400 then sends the order request to the particular TAS DC in which to provision services for the order request. In one embodiment, TAS DCs 402, 404 or 406 identify a service administrator and an identity domain administrator responsible for processing the order request at the particular TAS DC. The service administrator and the identity administrator may be nominated by the account administrator identified in the subscription order. TAS DCs 402, 404 or 406 communicate with SDI module 204 to orchestrate the provisioning of physical resources for the order. SDI component 204 in respective TAS DCs 402, 404 or 406 allocates resources and configures those resources needed to fulfill the subscription order.

In certain embodiments, TAS DCs, 402, 404 or 406 identify an identity domain associated with the subscription. SDI component 206 may provide the identity domain information to IDM component 200 (shown in FIG. 2) for identifying an existing identity domain or creating a new identity domain. Once the order is provisioned by the SDI module at respective TAS DCs, 402, 404 or 406, TAS central component 400 may place information regarding the provisioned resources in a support system, via support UI 216. Information may include, for example, displaying resource metrics related to the services and usage statistics of the services.

Once in operation, at each data center, EM module 208 to periodically collects usage statistics for each of the provisioned services provisioned at that data center, such as the amount of storage used, the amount data transferred, the number of users, and the amount of system up time and system down time. These statistics are provided to the TAS DC that is local to EM module 208 (i.e., at the same data center). In an embodiment, the TAS DCs may use the usage statistics to determine whether overuse of a service has occurred, and if so, to determine how much to bill for the overage, and provide the billing information to order management system 214.

Figure 5:
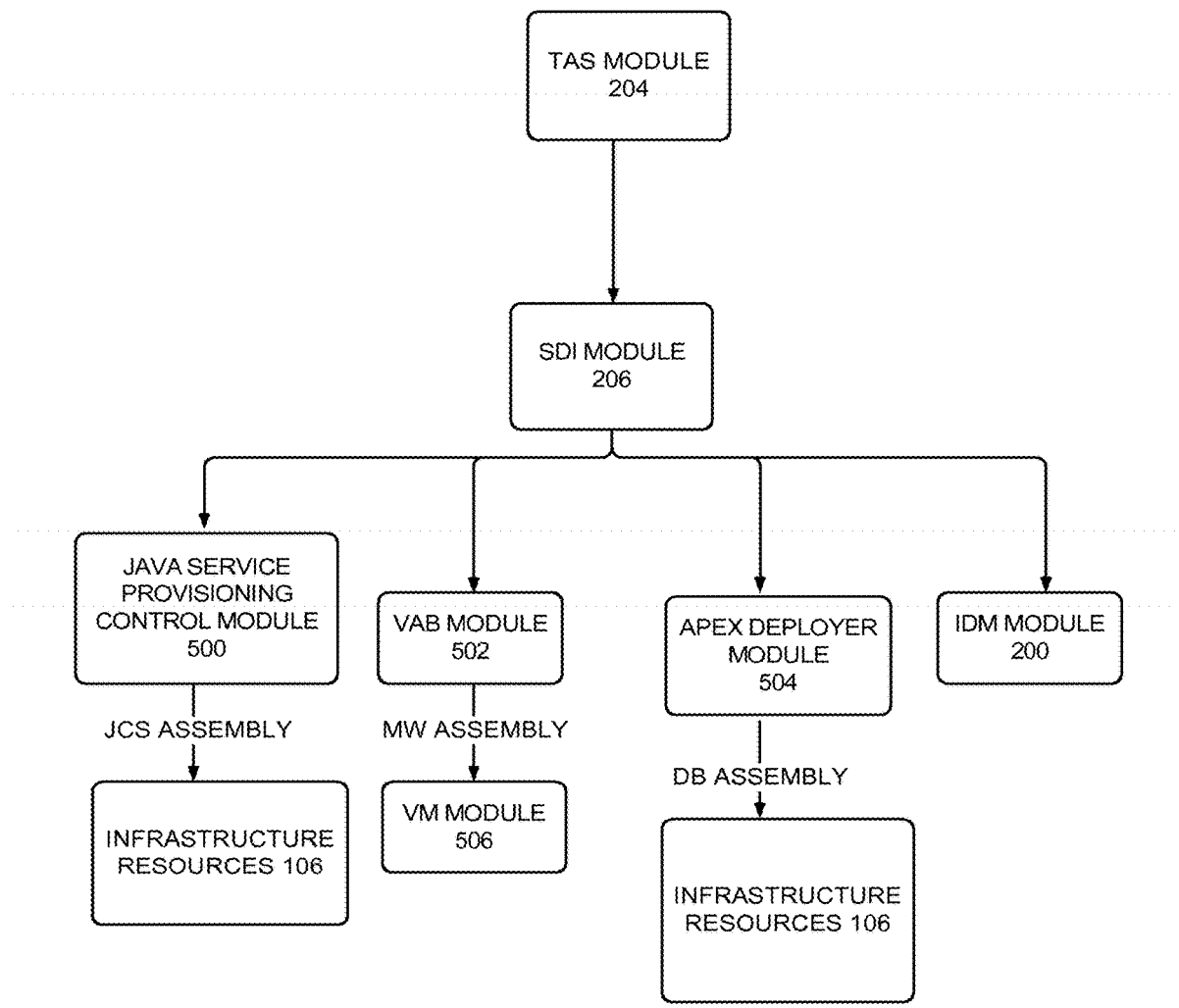
FIG. 5 is a simplified block diagram illustrating the interactions of the SDI module with one or more modules in the cloud infrastructure system, in accordance with an embodiment of the present invention.

FIG. 5 is a simplified block diagram illustrating the interactions of the SDI module with one or more modules in the cloud infrastructure system, in accordance with an embodiment of the present invention. In one embodiment, SDI module 206 interacts with TAS module 204 to provision resources for services in a subscription order received by TAS module 204. In certain embodiments, one or more of the modules illustrated in FIG. 5 may be modules within cloud infrastructure system 100. In other embodiments, one or more of the modules that interact with SDI module 206 may be outside cloud infrastructure system 100. In addition, alternative embodiments may have more or less modules than those shown in FIG. 5. These modules may be implemented in hardware, or software, or combinations thereof.

In one embodiment, the modules in SDI module 206 may include one or more modules in SaaS platform 102 and PaaS platform 104 in cloud infrastructure system 100. In order to perform provisioning of resources for various services, SDI module 206 may interact with various other modules, each customized to help with provisioning resources for a particular type of service. For example, as illustrated in FIG. 5, SDI module 206 may interact with a Java service provisioning control module 500 to provision Java cloud services. In one embodiment, Java service provisioning control component 500 may deploy a Java Cloud Service (JCS) assembly specified by SDI module 206 that includes a set of tasks to be performed to provision Java cloud services. Infrastructure resources 106 then determines the resources needed to provision the Java cloud services.

As other examples, SDI module 206 may interact with one or more modules such as a Virtual Assembly Builder (VAB) module 502, an Application Express (APEX) deployer module 504, a Virtual Machine (VM) module 506, an IDM module 200, and a database machine module 118. VAB module 502 includes capabilities to configure and provision complete multi-tier application environments. In one embodiment, VAB module 502 deploys a Middleware (MW) service assembly specified by SDI module 206 to provision a MW service in cloud infrastructure system 100 using the services provided by VM module 506. APEX deployer module 504 includes capabilities to configure and provision database services. In one embodiment, APEX deployer module 504 deploys a database service assembly specified by SDI module 206 to provision a database service in cloud infrastructure system 100 using the resources provided by infrastructure resources 106. SDI module 206 interacts with IDM module 200 to provide identity services such as access management across multiple applications in cloud infrastructure system 100.

Figure 6:
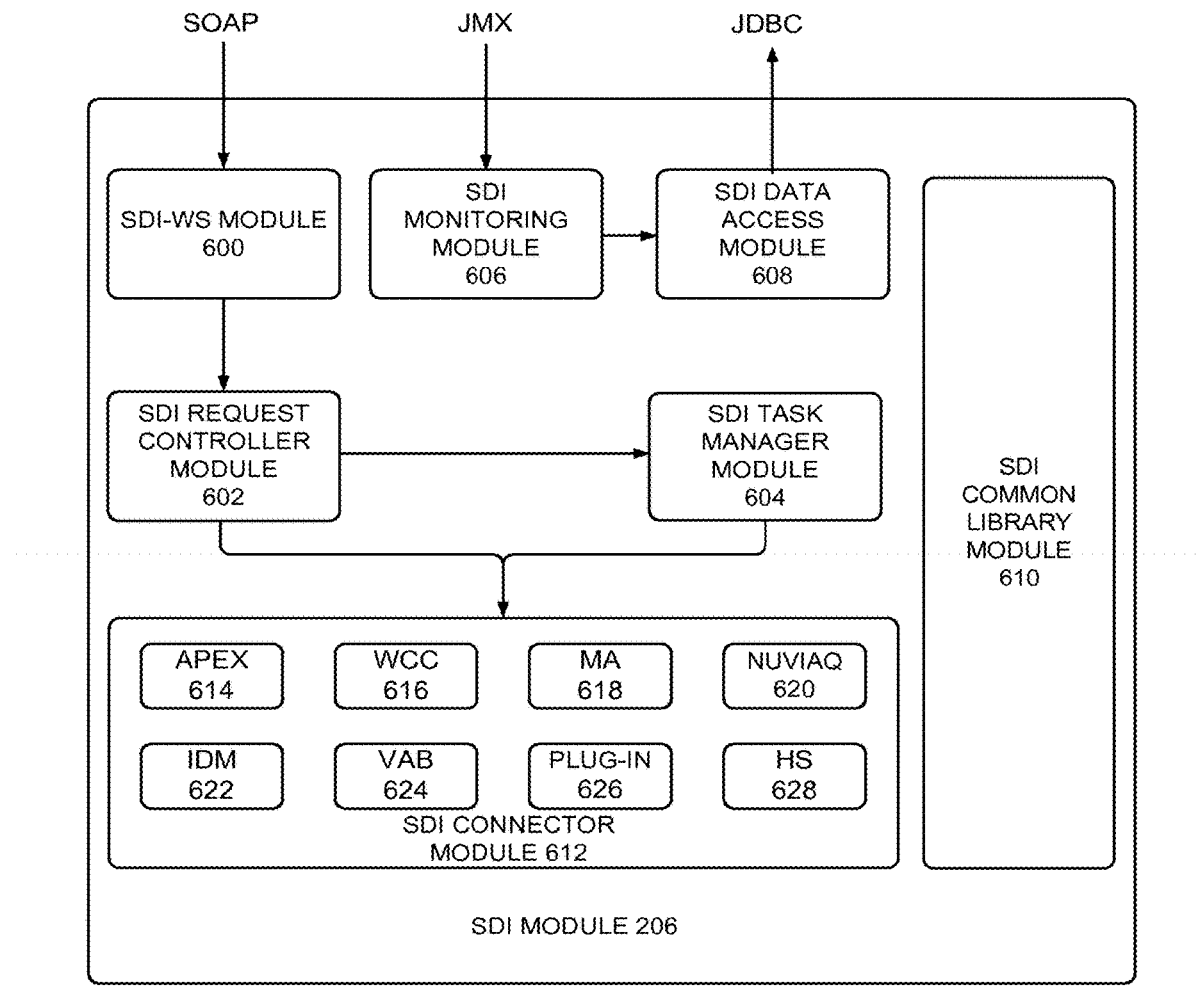
FIG. 6 depicts a simplified high level diagram of sub-modules of the SDI module according to an embodiment of the present invention.

FIG. 6 depicts a simplified high level diagram of sub-modules of the SDI module according to an embodiment of the present invention. In the embodiment depicted in FIG. 6, SDI module 206 includes a SDI-Web Services (WS) module 600, an SDI request controller module 602, an SDI task manager module 604, an SDI monitoring module 606, an SDI data access module 608, an SDI common library module 610, and an SDI connector module 612. These modules may be implemented in hardware, or software, or combinations thereof. SDI module 206 depicted in FIG. 6 and its various modules are meant for illustrative purposes only and are not intended to limit the scope of embodiments of the present invention. Alternative embodiments may have more or less modules than those shown in FIG. 6. These modules and their functions are described in detail below.

SDI-WS module 600 includes capabilities for receiving a step in the business associated with an order from business process executor 316 of TAS component 204. In one embodiment, SDI-WS module 600 parses each step of the business process and converts the step into an internal representation used by SDI module 206. In one embodiment, each step of the business process associated with the order arrives through a web service processing layer (for example, via System Provisioning API discussed in FIG. 3B) in the form of a SOAP request to SDI-WS module 600.

SDI request controller module 602 is the internal request processing engine in SDI module 206 and includes capabilities for performing asynchronous request processing, concurrent request processing, concurrent task processing, fault tolerant and recovery and plug-in support related to the order requests. In one embodiment, SDI request controller module 602 accepts each step of the business process associated with the order from SDI-WS module 600 and submits the step to SDI task manager module 604.

SDI task manager module 604 translates each step specified in the business process into a series of tasks for provisioning the particular step. Once the set of tasks for a specific step have been provisioned, SDI task manager module 604 responds to business process executor 316 in TAS module 204 with operation results that includes an order payload with details of the resources provisioned to fulfill the particular step. SDI task manager module 604 repeats this process until all the steps of the particular business process associated with the order are complete.

In certain embodiments, SDI task manager module 604 translates each step specified in the business process into a series of tasks by utilizing the services of SDI connector module 612. SDI connector module 612 includes one or more connectors for handling the deployment of tasks specified by SDI task manager module 604 to provision one or more services related to the order request. In certain embodiments, one or more of the connectors may handle tasks that are specific to a particular service type while other connectors may handle tasks that are common across different service types. In one embodiment, SDI connector module 612 includes a set of connectors (wrapper APIs) that interface with one or more of the external modules (shown in FIG. 5) in cloud infrastructure system 100 to provision the services and resources related to the order request. For example, Application Express (APEX) connector 614 interfaces with APEX deployer module 504 to provision database services. Web Center Connector 616 (WCC) interfaces with a web center module in cloud infrastructure system 100 to provision web services. The web center module is a user engagement platform and includes capabilities for delivering connectivity between people and information in cloud infrastructure system 100.

In certain embodiments, Middleware Applications (MA) connector 618 interfaces with VAB module 502 in cloud infrastructure system 100 to provision middleware application services. NUVIAQ connector 620 interfaces with VAB module 502 to provision Java services. IDM connector 622 interfaces with IDM module 200 to provide identity and access management for users subscribing to services and resources in cloud infrastructure system 100. Virtual Assembly Builder (VAB) connector 624 interfaces with VAB module 502 in cloud infrastructure system 100 to configure and provision complete multi-tier application environments. Plug-in connector 626 interfaces with EM module 208 to manage and monitor the components in cloud infrastructure system 100. HTTP server connector 628 interfaces with one or more web servers in the PaaS platform to provide connection services to users in cloud infrastructure system 100.

SDI monitoring module 606 in SDI module 206 provides an inbound interface for receiving Java Management Extensions (JMX) requests. SDI monitoring module 606 also provides tools for managing and monitoring applications, system objects and devices in cloud infrastructure system 100. SDI-data access module 608 provides an inbound interface for receiving Java Database Connectivity (JDBC) requests. SDI-data access module 608 supports data access and provides object relational mapping, java transaction API services, data access objects, and connection pooling in cloud infrastructure system 100. The SDI-common library module 610 provides configuration support for the modules in SDI module 206.

Figure 7A:
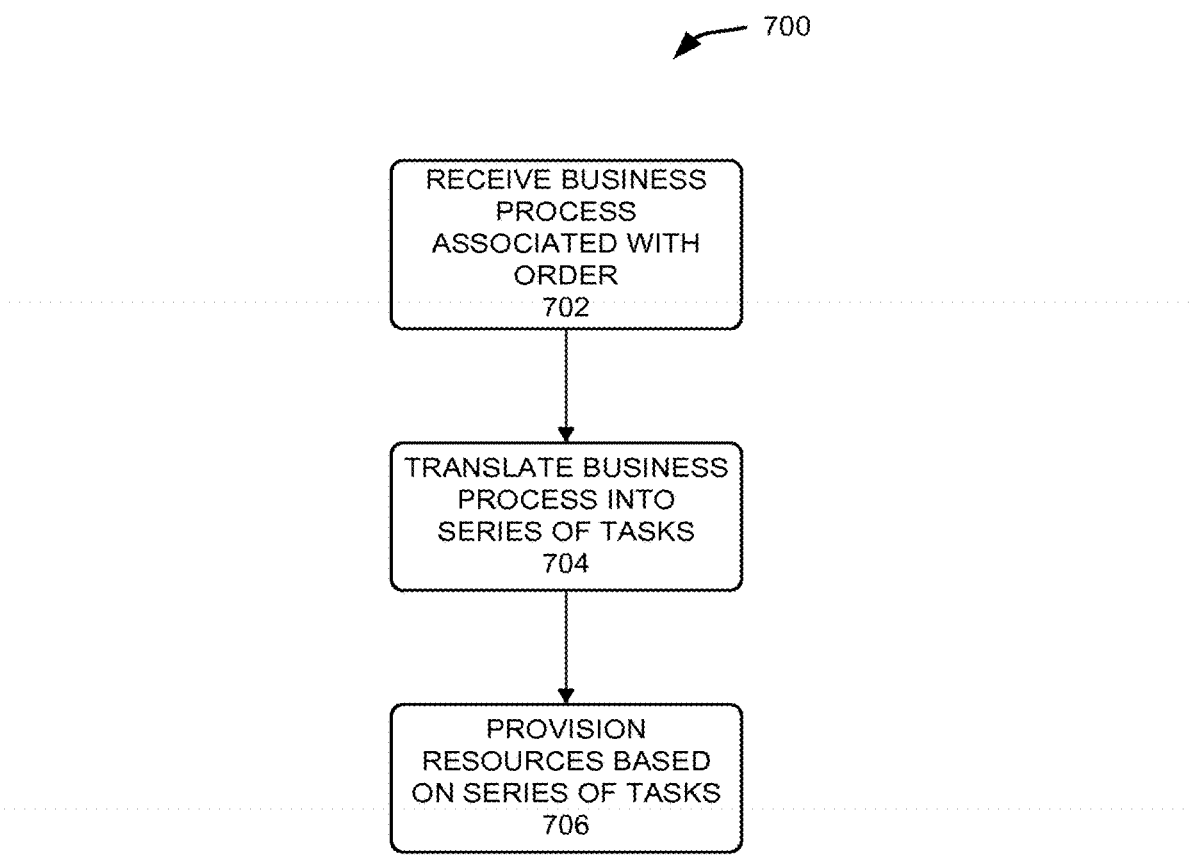
FIG. 7A depicts a simplified flowchart depicting processing that may be performed by the SDI component in the cloud infrastructure system, in accordance with an embodiment of the present invention.

The embodiment of FIG. 6 discussed above describes modules in the SDI module according to an embodiment of the present invention. FIG. 7A depicts a simplified flowchart 700 depicting processing that may be performed by the modules of the SDI module in the cloud infrastructure system, in accordance with an embodiment of the present invention. The processing depicted in FIG. 7A may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 7A is not intended to be limiting. Other sequences of steps may also be performed according to alternative embodiments. For example, alternative embodiments of the present invention may perform the steps outlined above in a different order. Moreover, the individual steps illustrated in FIG. 7A may include multiple sub-steps that may be performed in various sequences as appropriate to the individual step. Furthermore, additional steps may be added or removed depending on the particular applications. One of ordinary skill in the art would recognize many variations, modifications, and alternatives. In one embodiment, the processing depicted in FIG. 7A may be performed by one or more modules in the SDI module 206 discussed in detail in FIG. 6.

At 702, a business process associated with a subscription order is received. In one embodiment, SDI-WS module 600 in SDI module 206 receives one or more steps in the business process associated with the subscription order from business process executor 316. At 704, each step in the business process is translated into a series of tasks for provisioning resources for the subscription order. In one embodiment, SDI task manager module 604 in SDI module 206 translates each step specified in the business process into a series of tasks by utilizing the services of SDI connector module 612. At 706, the subscription order is provisioned based on the series of tasks. In one embodiment, and as discussed in FIG. 6, SDI connector module 612 includes one or more connectors for handling the deployment of tasks specified by SDI task manager module 604 to provision resources for the services in the subscription order.

As described above with respect to FIG. 6, SDI task manager module 604 translates each step specified in a business process into a series of tasks by utilizing the services of SDI connector module 612, which may include one or more connectors for handling the deployment of tasks specified by SDI task manager module 604 to provision one or more services related to the order request. One or more of the connectors may handle tasks that are specific to a particular service type while other connectors may handle tasks that are common across different service types. In one embodiment, SDI connector module 612 includes a set of connectors (wrapper APIs) that interface with one or more of the external modules (shown in FIG. 5) in cloud infrastructure system 100 to provision the services and resources related to the order request. For example, a NUVIAQ connector 620 interfaces with VAB module 502 to provision Java services.

Figure 7B:
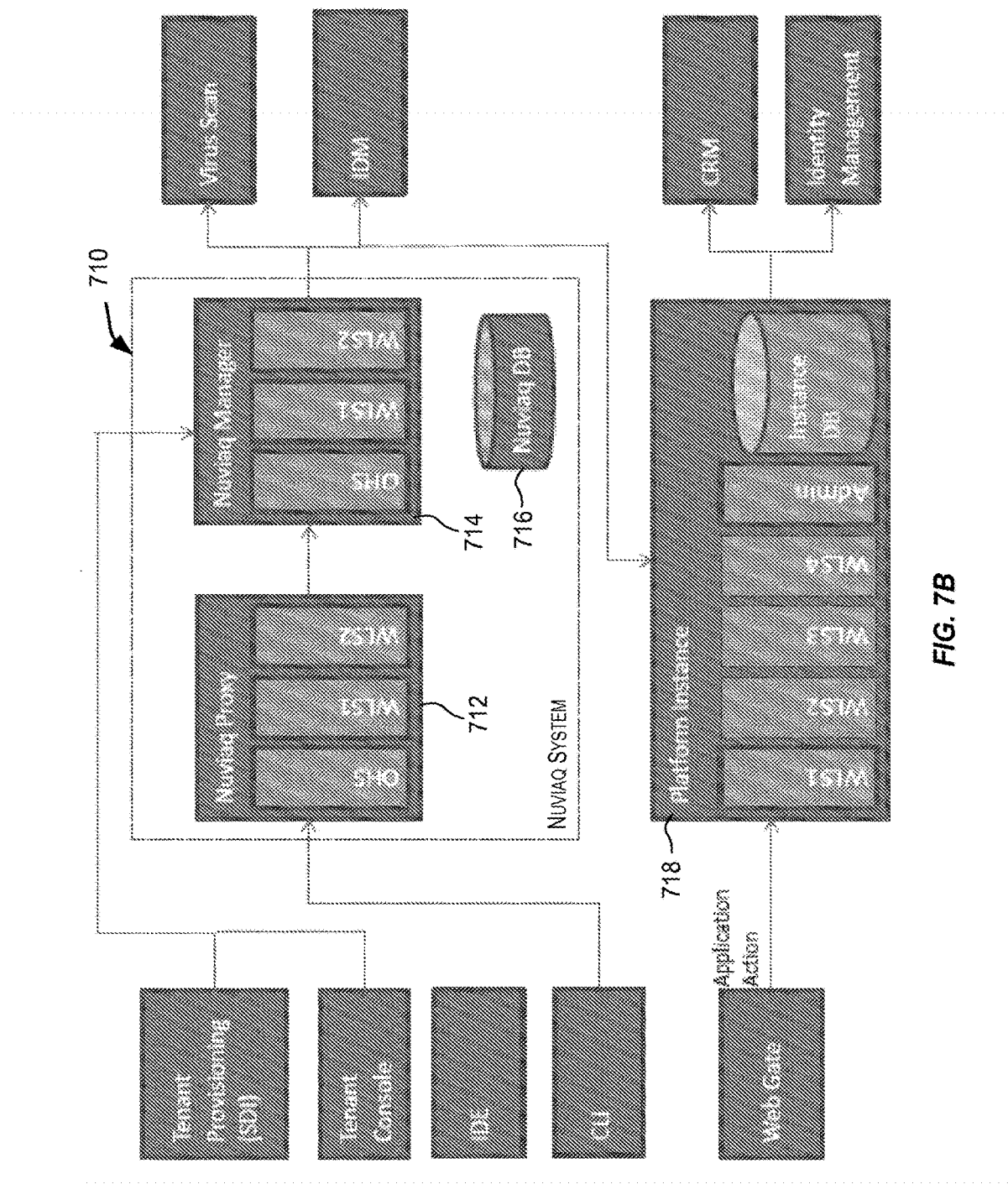
FIG. 7B depicts a simplified block diagram showing the high-level architecture of a Nuviaq system 710 and its relationships with other cloud infrastructure components according to an embodiment of the present invention.

FIG. 7B depicts a simplified block diagram showing the high-level architecture of a Nuviaq system 710 and its relationships with other cloud infrastructure components according to an embodiment of the present invention. It should be appreciated that Nuviaq system 710 depicted in FIG. 7B may have other components than those depicted in FIG. 7B. Further, the embodiment shown in FIG. 7B is only one example of a cloud infrastructure system that may incorporate an embodiment of the invention. In some other embodiments, Nuviaq system 710 may have more or fewer components than shown in FIG. 7B, may combine two or more components, or may have a different configuration or arrangement of components.

In certain embodiments, Nuviaq system 710 may be configured to provide a runtime engine for orchestrating PaaS operations. Nuviaq system 710 may provide a web service API to facilitate integration with other products and services. Nuviaq system 710 also provides support for complex workflows in system provisioning, application deployment and associated lifecycle operations and integrates with management and monitoring solutions.

In the embodiment depicted in FIG. 7B, Nuviaq system 710 comprises a Nuviaq proxy 712, a Nuviaq manager 714, and a Nuviaq database 716. In certain embodiments, Nuviaq manager 714 provides an entry point into Nuviaq system 710, providing secure access to PaaS operations via the web service API. Internally, it tracks system state in the database and controls job execution on the workflow engine. In a public cloud, Nuviaq manager 714 may be accessed by the Tenant Provisioning system (SDI 206) and the Tenant Console, to drive provisioning and deployment operations respectively.

In one embodiment, Nuviaq manager 714 executes jobs asynchronously via an internal workflow engine. A job may be a sequence of actions specific to a given PaaS workflow. Actions may be performed in order, with failure in any step resulting in failure of the overall job. Many workflow actions delegate to external systems relevant to the workflow, such as the EM command line interface (cli). In one implementation, Nuviaq manager 714 application may be hosted in a 2-node WebLogic cluster with associated HTTP server (e.g., Oracle HTTP Server or OHS) instance, running inside a firewall.

In certain embodiments, Nuviaq proxy 712 is the public access point to the Nuviaq API. In one embodiment, only Public API may be exposed here. Requests received by proxy 712 may be forwarded to Nuviaq manager 714. In one embodiment, Nuviaq proxy 712 runs outside the firewall, whereas manager 714 runs within the firewall. In one implementation, Nuviaq proxy 712 application runs on a WebLogic cluster running outside the firewall.

In certain embodiments, Nuviaq database 716 tracks various domain entities such as, without limitation, platform instance, deployment plan, application, WebLogic domain, jobs, alerts, and the like. Primary keys may be aligned with the Service Database where appropriate.

In one embodiment, Platform Instance 718 may contain all resources required for a WebLogic service for a given tenant.

Nuviaq system 710 may rely on additional systems of cloud infrastructure system 100 to carry out the workflows used the WebLogic cloud service. These dependencies may include dependencies on SDI 206, IDM 200, a virus scan system, a service database, CRM instances, and the like. For example, Nuviaq system 710 may depend upon functions performed by an Assembly Deployer in SDI 206. In one embodiment, the Assembly Deployer is a system to manage interactions with OVAB (Oracle Virtual Assembly Builder) and OVM (Oracle Virtual Machine). Capabilities of the Assembly Deployer used by Nuviaq system 710 may include, without limitation, functions for deploying an assembly, un-deploying an assembly, describing assembly deployment, scaling appliance, and the like. In one implementation, Nuviaq system 710 accesses the Assembly Deployer via a web service API.

In certain embodiments, security policies may require certain artifacts to be scanned for viruses before being deployed to an application. Cloud infrastructure system 100 may provide a virus scan system for this purpose that provides scanning as a service for multiple components of the public cloud.

In certain embodiments, a public cloud infrastructure may maintain a Service Database containing information about tenants (e.g., customers) and their service subscriptions. Nuviaq workflows may access to this data in order to properly configure a WebLogic service as a client to other services that the tenant also subscribes to.

Nuviaq system 710 may depend on IDM 200 for its security integration. In certain embodiments, Java Service instances can be associated with a CRM instance. The association allows user applications deployed to their Java Service instance to access a CRM instance though Web Service calls.

Various entities may use services provided by Nuviaq system 710. These clients of Nuviaq system 710 may include: a Tenant Console, which is an management server (e.g., Oracle Management Server) based user interface that customers may access to manage their applications on their platform instances; several IDEs such as Oracle IDEs (JDeveloper, NetBeans, and OEPE) have been extended to offer access to application lifecycle management operations; one or more Command Line Interfaces (CLIs) that are available to access lifecycle operations on the platform instances.

Provisioning use case for Nuviaq system 710—A Provision Platform Instance use case is realized via the Create Platform Instance operation of the Nuviaq API. In the context of cloud infrastructure system 100, a service instance with respect to the Nuviaq system corresponds to a Nuviaq platform instance. A platform instance is assigned a unique identifier is used on all subsequent operations related to this instance. A Platform Deployment descriptor provided to the Create Platform Instance action allows for properties to be set that modify the configuration of the platform instance to meet the subscription requirements of the tenant. These properties may include for example:

Property#1: oracle.cloud.service.weblogic.size
   Values: BASIC, STANDARD, ENTERPRISE
   Description: Specifies the subscription type. This impacts the number of servers, database limits and quality of service settings.
Property#2: oracle.cloud.service.weblogic.trial
   Values: TRUE, FALSE
   Description: Indicates whether or not this is a trial subscription.
Property#3: oracle.cloud.service.weblogic.crm
   Values: CRM Service ID
   Description: Identifies a CRM service to be associated with this WebLogic service instance.

Figure 7C:
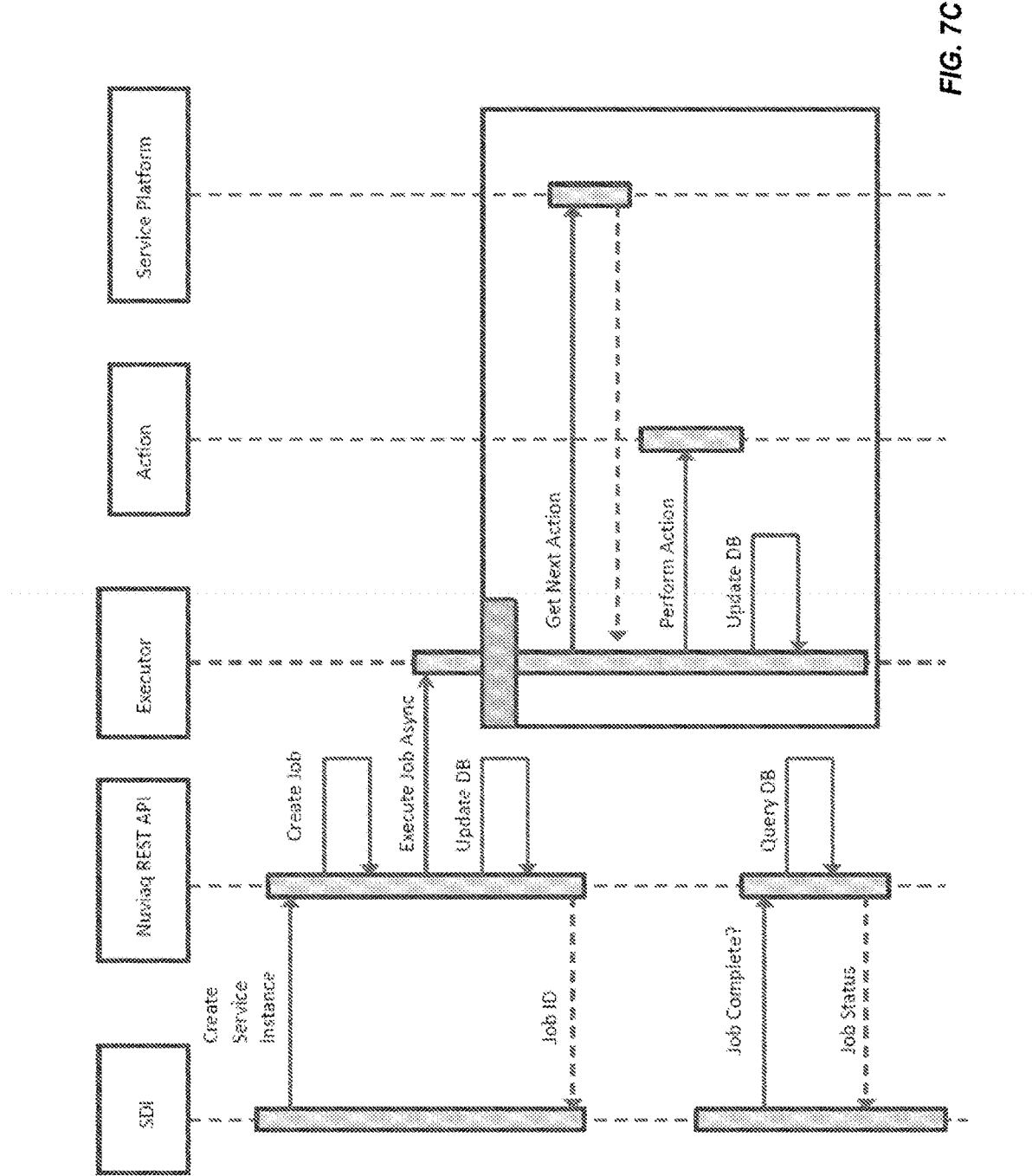
FIG. 7C depicts an example sequence diagram illustrating steps of a provisioning process using a Nuviaq system according to an embodiment of the present invention.

FIG. 7C depicts an example sequence diagram illustrating steps of a provisioning process using a Nuviaq system according to an embodiment of the present invention. The sequence diagram depicted in FIG. 7C is only an example and is not intended to be limiting.

Install/Update Application use case—The Install Application operation deploys an application to a running WebLogic Server after validating that the application archive meets the security requirements of the Public Cloud. In one embodiment, the Application Deployment descriptor provided to the Install Application action allows for properties to be set that modify the configuration of the application to meet the subscription requirements of the tenant. These properties may include for example:

Property: oracle.cloud.service.weblogic.state
Values: RUNNING, STOPPED
Description: Specifies the initial state of the application after deployment.

Figure 7D:
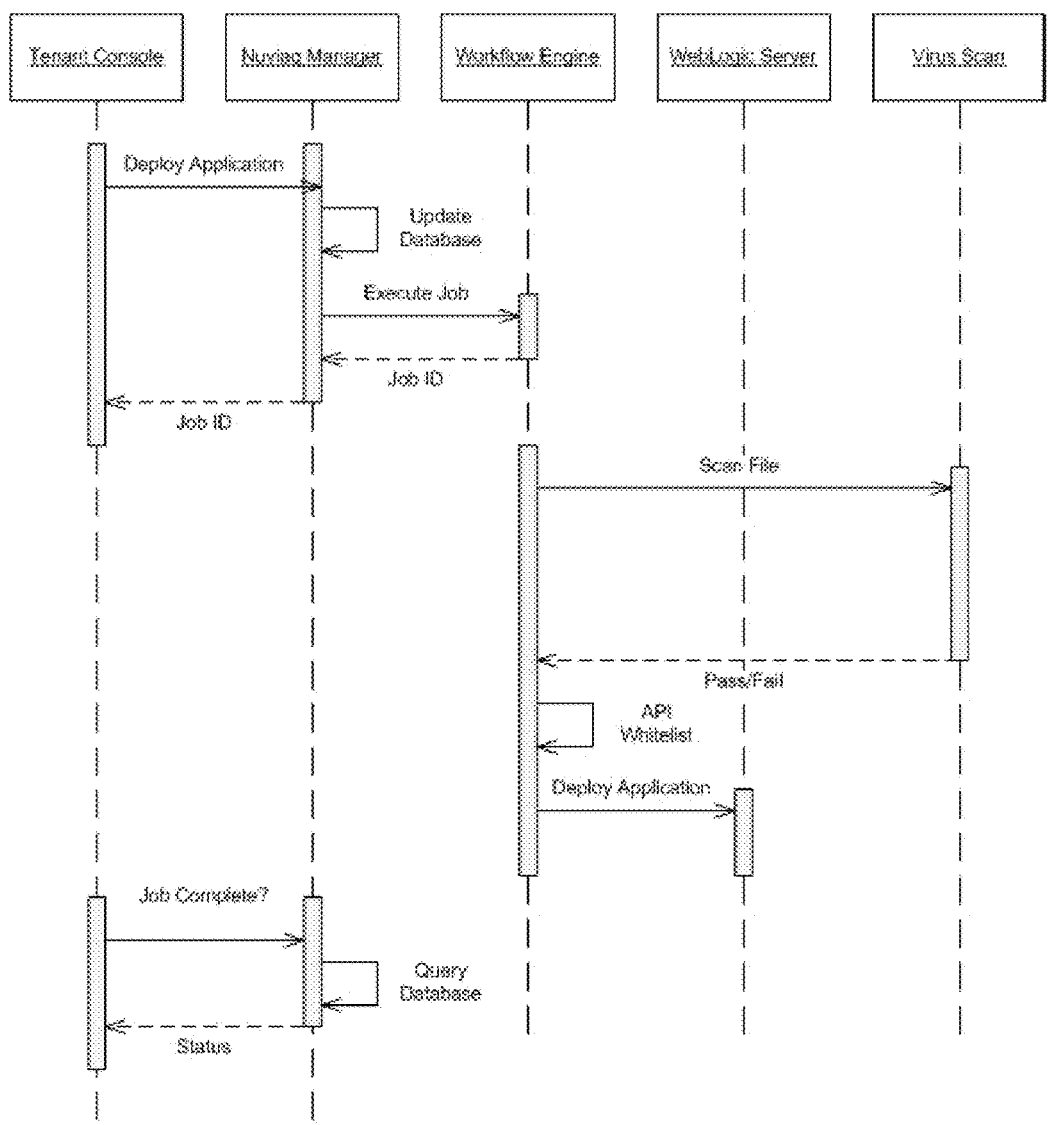
FIG. 7D depicts an example sequence diagram illustrating steps of a deployment process using a Nuviaq system according to an embodiment of the present invention.

FIG. 7D depicts an example sequence diagram illustrating steps of a deployment process using a Nuviaq system according to an embodiment of the present invention. The sequence diagram depicted in FIG. 7D is only an example and is not intended to be limiting.

Referring back to FIG. 2, in certain embodiments, TAS 204 and SDI 206 working in cooperation are responsible for provisioning resources for one or more services ordered by a customer from a set of services offered by cloud infrastructure system 100. For example, in one embodiment, for provisioning a database service, the automated provisioning flow may be as follows for a paid subscription:

(1) Customer places an order for a paid subscription to a service via Store UI 210.
(2) TAS 204 receives the subscription order.
(3) When services are available TAS 204 initiates provisioning by using the services of SDI 206. TAS 204 may perform business process orchestration, which will execute the relevant business process to complete the provisioning aspect of the order. In one embodiment, TAS 204 may use a BPEL (Business Process Execution Language) Process Manager to orchestrate the steps involved in the provisioning and handle the lifecycle operations.
(4) In one embodiment, to provision a database service, SDI 206 may call PLSQL APIs in the CLOUD_UI to associate a schema for the requesting customer.
(5) After successful association of a schema to the customer, SDI signals TAS and TAS send a notification to the customer that the database service is now available for use by the customer.
(6) The customer may log into cloud infrastructure system 100 (e.g., using an URAL such as cloud.oracle.com) and activate the service.

In some embodiments, a customer may also be allowed to subscribe to a service on a trial basis. For example, such a trial order may be received via cloud UI 212 (e.g., using cloud.oracle.com).

Figure 7E:
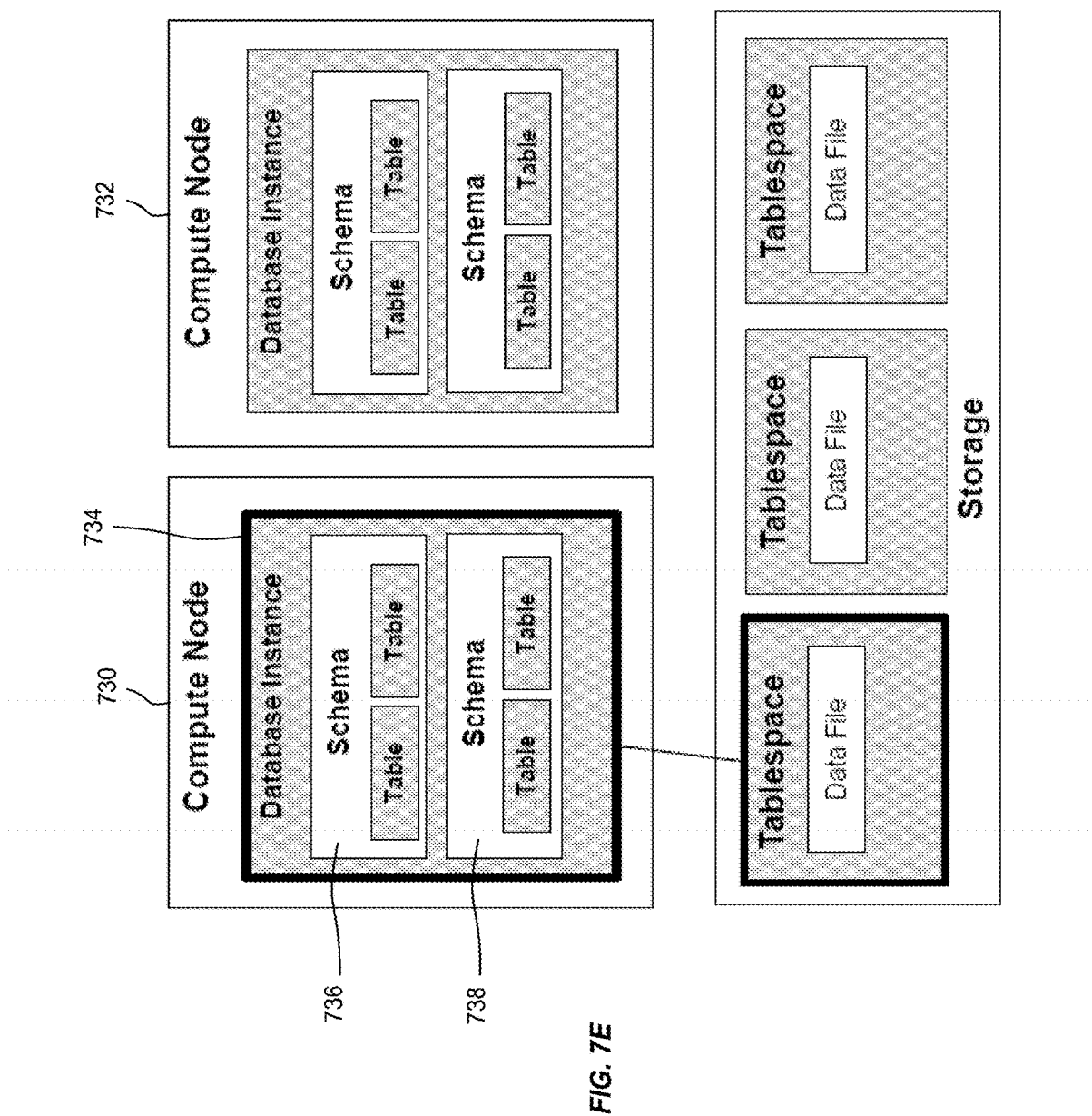
FIG. 7E depicts an example of database instances provisioned for a database service according to an embodiment of the present invention.

In certain embodiments, cloud infrastructure system 100 enables underlying hardware and service instances to be shared between customers or tenants. For example, the database service may be provisioned as shown in FIG. 7E in one embodiment. FIG. 7E depicts multiple Exadata compute nodes 730 and 732, each providing a database instance provisioned for the database service. For example, compute node 730 provides a database instance 734 for a database service. Each Exadata compute node may have multiple database instances.

In certain embodiments, each database instance can comprise multiple schemas and the schemas may be associated with different customers or tenants. For example, in FIG. 7E, database instance 734 provides two schemas 736 and 738, each with its own tables. Schema 736 may be associated with a first customer or tenant subscribing to a database service and schema 738 may be associated with a second customer or tenant subscribing to the database service. Each tenant gets a completely isolated schema. Each schema acts like a container that can manage database objects including tables, views, stored procedures, triggers, etc. for the associated tenant. Each schema may have one dedicated tablespace, with each tablespace having one data file.

In this manner, a single database instance can provide database services to multiple tenants. This not only enables sharing of underlying hardware resources but also enables sharing of service instance between tenants.

In certain embodiments, such a multi-tenancy system is facilitated by IDM 200, which beneficially enables multiple separate customers, each having their own separate identity domains, to use hardware and software that is shared in the cloud. Consequently, there is no need for each customer to have its own dedicated hardware or software resources, and in some cases resources that are not being used by some customers at a particular moment can be used by other customers, thereby preventing those resources from being wasted. For example, as depicted in FIG. 7E, a database instance can service multiple customers each with their respective identity domains. Although each such database service instance can be a separate abstraction or view of a single physical multi-tenant database system that is shared among the many separate identity domains, each such database service instance can have a separate and potentially different schema than each other database service instance has. Thus, the multi-tenant database system can store mappings between customer-specified database schemas and the identity domains to which those database schemas pertain. The multi-tenant database system can cause the database service instance for a particular identity domain to use the schema that is mapped to that particular identity domain.

The multi-tenancy can also be extended to other services such as the Java Service. For example, multiple customers can have a JAVA service instance placed within their respective identity domains. Each such identity domain can have a JAVA virtual machine, which can be viewed as being a virtual "slice" of hardware. In one embodiment, a job-monitoring service (e.g., Hudson) can be combined with a JAVA enterprise edition platform (e.g., Oracle WebLogic) in the cloud to enable each separate identity domain to have its own separate virtual "slice" of the JAVA enterprise edition platform. Such a job-monitoring service can, for example, monitor the execution of repeated jobs, such as building a software project or jobs run by an operating system's time-based job scheduler. Such repeated jobs can include the continuous building and/or testing of software projects. Additionally or alternatively, such repeated jobs can include the monitoring of executions of operating system-run jobs that are executed on machines that are remote from the machine on which the job-monitoring service executes.

Multi-Tenant Application

In certain embodiments, cloud infrastructure system 100 provides a faster, easier and non-intrusive way to achieve multi-tenancy/virtualization in applications including legacy applications, keeping most of the existing code/design as it is and improves code quality by reducing coupling. Nowadays it has almost become a requirement to have applications deployed both on premise and on the cloud and provide the same functionality everywhere. A single application developed with just functional requirements in mind can work for customers with on premise deployments. However, the same application if deployed on cloud to be used by multiple customers/tenants having per tenant customizations, configurations, and resource integrations requires per tenant application deployment. This can be very costly and complicated to manage and loses all the benefits of cloud.

In order to support per tenant customizations, configurations and resource integrations with one single application, an application can be developed/changed in such a way that one single deployment can serve multiple customers with parallel tenant access. The application can separate tenant storage and runtime data such that there is no overlap. This can introduce tenant specific logic in the functional components of the application, as all the application level singletons would now be tenant level singletons or application level static data access would be tenant level static data access, caching has to be per tenant etc. This could result in either two versions of the same application one for the cloud and one for on premise deployments or a total re-write of the application with tenant specific logic built into it.

In one aspect, cloud infrastructure system 100 achieves application multi-tenancy using a hierarchical bean factory container without knowledge of multi-tenancy in the functional code. Cloud infrastructure system 100 can provide a hierarchy of bean factories that handle each tenants context and any shared resources. In such an embodiment, cloud infrastructure system 100 treats each tenant as a child bean factory or sub-container running inside the main application container.

At login time, tenant information is taken and added to a session context in one embodiment. The tenant information can then be made available everywhere throughout the lifetime of the current login session. At the time of bean factory access, the tenant information can be extracted from the session context to access the bean factory container appropriate to that tenant. By defining integration on interfaces whose implementations are provided by the bean factory container, all integrations can happen via the bean factory container. A parent shared bean factory can be provided and a child per tenant bean factory can override beans in the parent factory. Tenant aware components can be defined in the child bean factory and the child can be loaded one per tenant while all shared components are defined in the parent bean factory that is loaded once for whole of application.

In various embodiments, the parent bean factory is never directly accessed. Access is managed via the child bean factory. In one aspect, based on a tenant identifier in a call context, cloud infrastructure system 100 can access the right child bean factory to get all tenant specific info which can never be shared across tenants. The approach can be applied to any new application development or existing applications can be refactored easily to become multi-tenant enabled while other approaches which require multi-tenant awareness in code/design are difficult/impossible to apply in existing/legacy applications.

Figure 8:
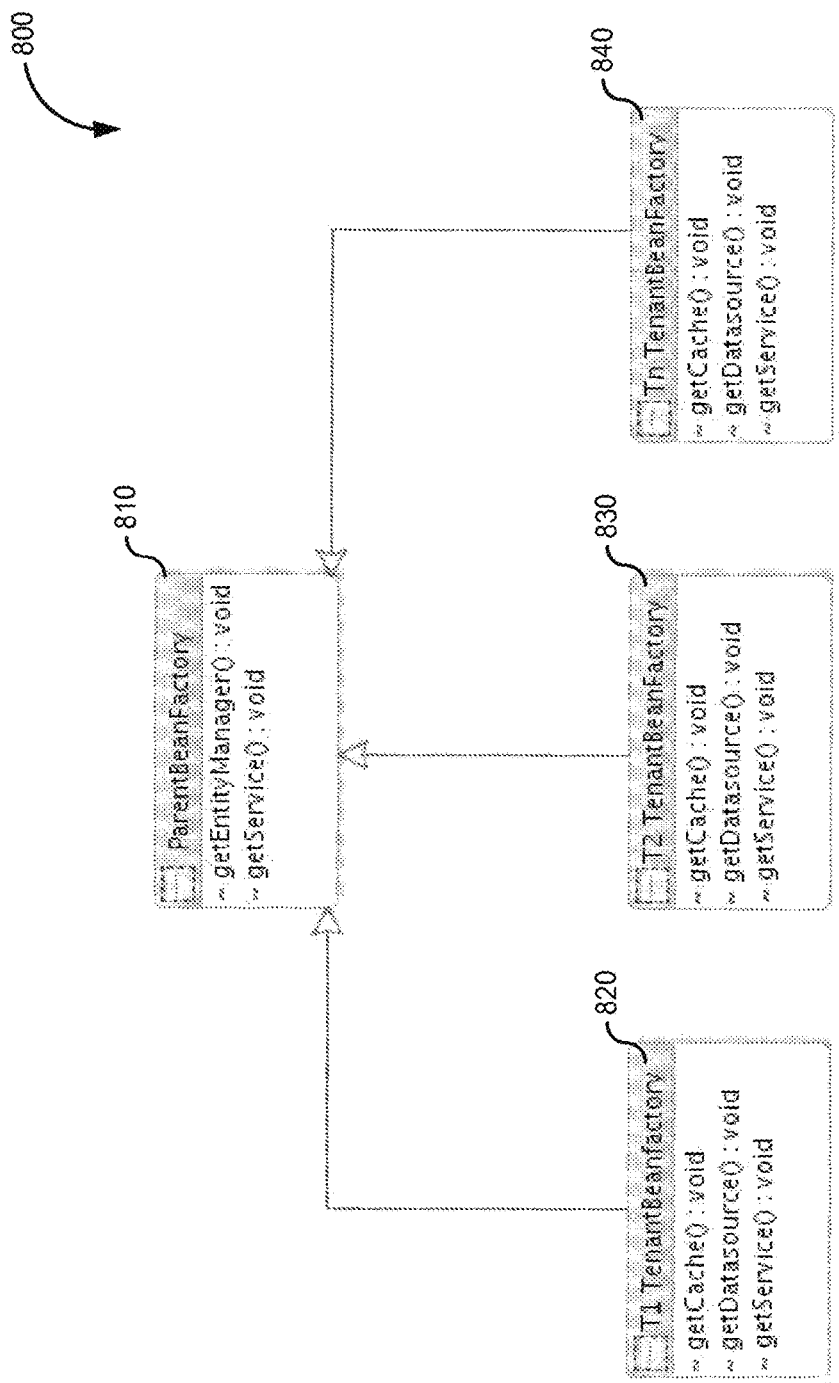
FIG. 8 illustrates a high level overview of a hierarchical bean factory in accordance with an embodiment of the present invention.

FIG. 8 illustrates a high level overview of hierarchical bean factory 800 in accordance with an embodiment of the present invention. In this embodiment, on premise and cloud deployment support for a single application is provided in a highly non-intrusive way without effecting application functional logic. On premise deployments can be running with fixed default tenant and no tenant information needs to be captured anywhere anytime. The application code can be accessing the bean factory to get tenant specific information or shared resources seamlessly without knowledge of multi-tenancy in functional code anywhere.

In this embodiment, hierarchical bean factory 800 includes parent bean factory 810 and children bean factories 820, 830, and 840. Each bean factory controls the life cycle of an object/bean and applications never directly create that object but they extract it from the factory. The factory handles the creation, pooling, and destruction of the object.

All across tenant shared services and data access happens via parent bean factory 810. Parent bean factory 810 can be defined at the application level. All per tenant customizations, resource access (database access, etc.), caching, and the like happens via child bean factories 820, 830, and 840 which extend parent bean factory 810. All services or implementations which are stateless can be defined in parent bean factory 810 as there can be no overlap of information with stateless beans. Similarly, all services which have inbuilt multi-tenancy support can also be defined at parent bean factory 810. All static data or singletons need to be accessed via child bean factories 820, 830, and 840.

Figure 9:
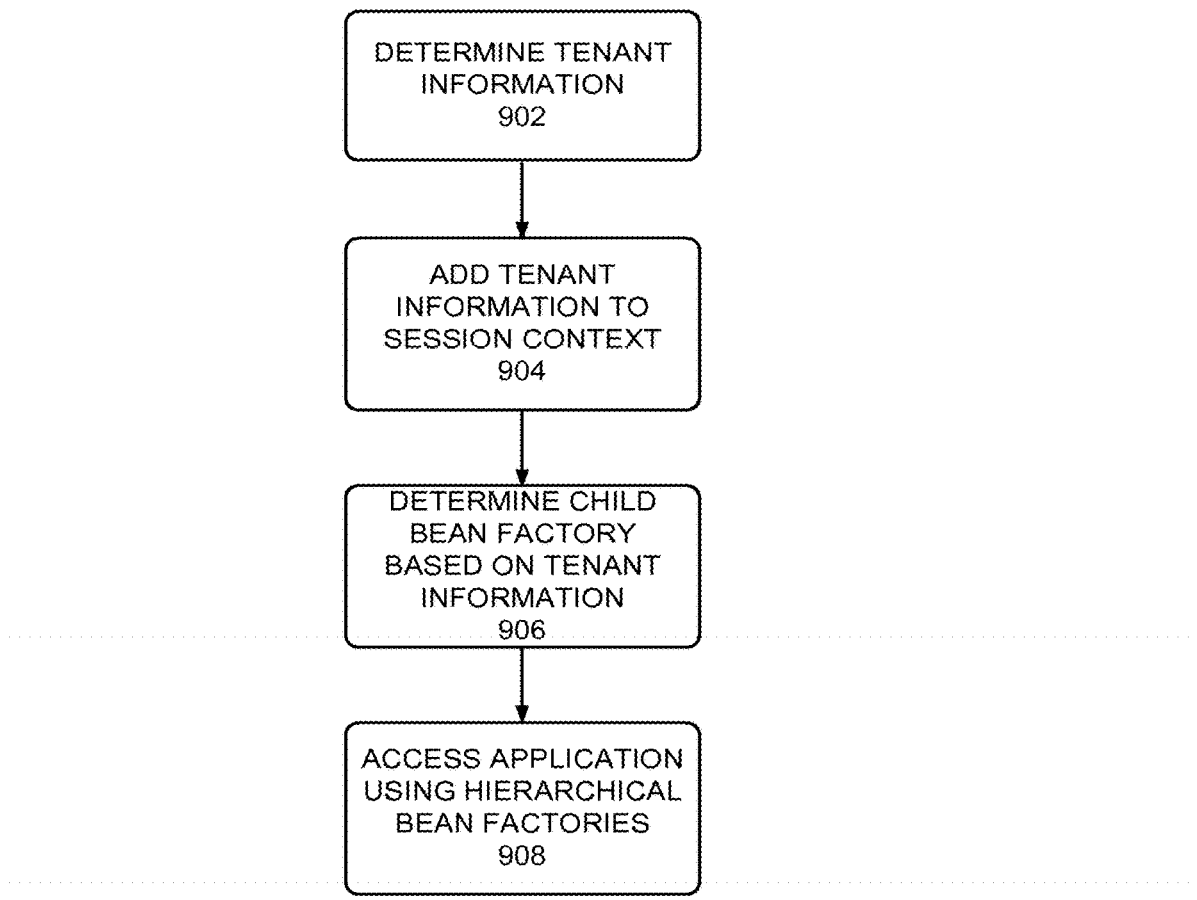
FIG. 9 is a flowchart of a method for access an application according to various embodiments.

FIG. 9 is a flowchart of method 900 for access an application according to various embodiments. The processing depicted in FIG. 9 may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 9 is not intended to be limiting. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives. FIG. 9 begins in step 902.

In step 902, tenant information is determined. In various embodiments, tenant information is determined at login time. Tenant information may include a tenant identifier or other tenant-specific information. In step 904, the tenant information is added to a session context. In one embodiment, the tenant information is referenced so that its available everywhere throughout the lifetime of the current login session.

In step 906, a child bean factory is determined based on the tenant information. In various embodiments, the child bean factory for a tenant identified by the tenant information extends a parent bean factory for a given application. In step 908, the application is accessed using the per tenant child bean factory. As discussed above, all services or implementations which are stateless are defined in the parent bean factory. All static data or singletons are accessed via the child bean factory. FIG. 9 ends in step 908.

Figure 10:
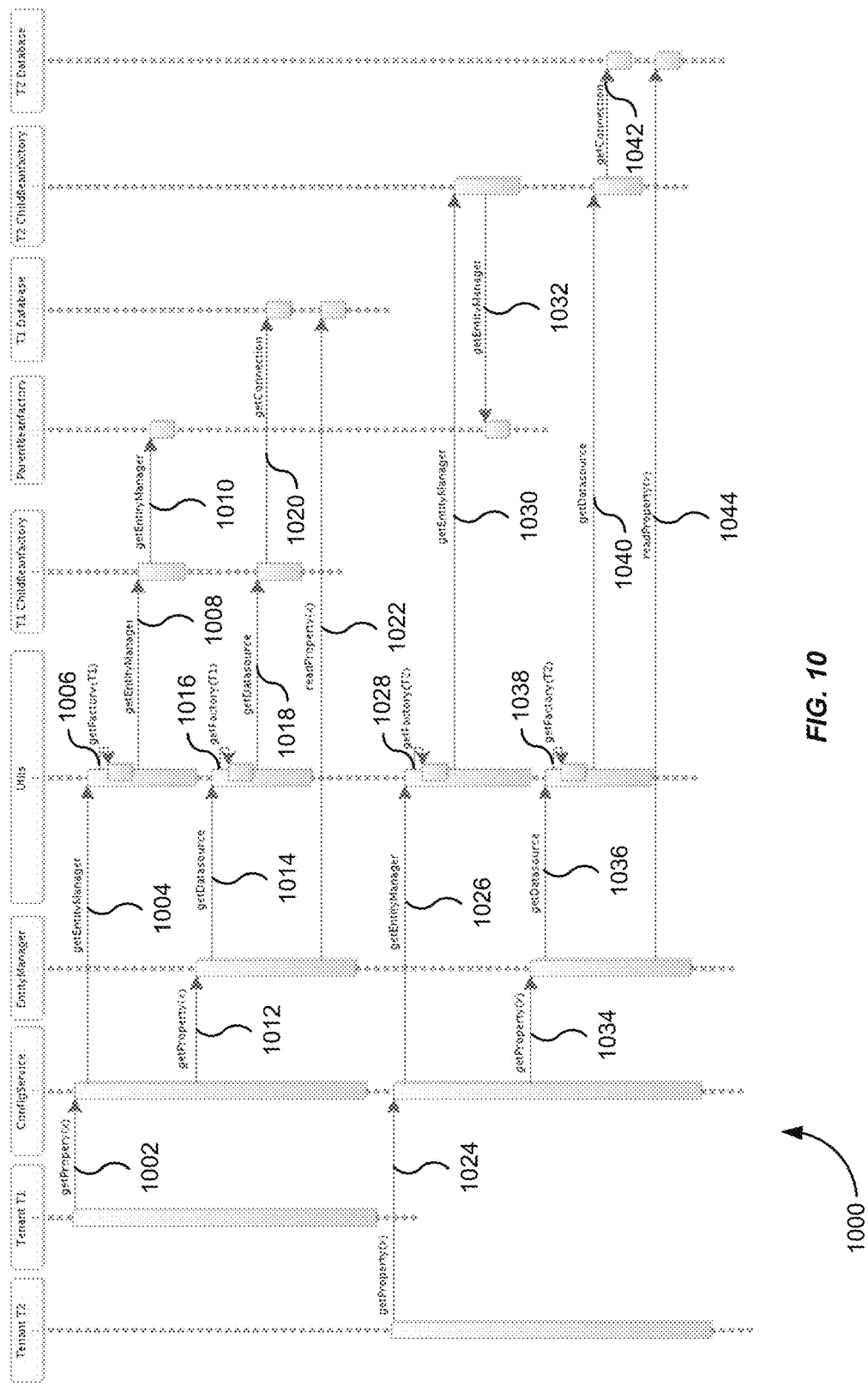
FIG. 10 is a flowchart of a sequence for determining an appropriate bean factory container in hierarchical bean factory using tenant information according to various embodiments.

FIG. 10 is a flowchart of sequence 1000 for determining an appropriate bean factory container in hierarchical bean factory using tenant information according to various embodiments. The processing depicted in FIG. 10 may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 10 is not intended to be limiting. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives. FIG. 10 begins in step 1002.

In step 1002, tenant T1 invokes a function named "getProperty" in order to retrieve property X from a Configuration Service (ConfigService). In step 1004, in order to determine from which entity property X is to be retrieved, ConfigService invokes a function named "getEntityManager" to retrieve an entity manager from a Utility Service (Utils). Utils identifies tenant information from the current session context. In this example, the tenant information identifies tenant T1 as invoking the function in step 1002. In step 1006, Utils invokes a function named "getFactory" using the tenant information for tenant T1 in order to determine the appropriate bean factory to handle the getEntityManager request.

In step 1008, Utils invokes a function named "getEntityManager" from a child bean factory for tenant T1. In one aspect, if the getEntityManager function is specific to tenant T1, the child bean factory for tenant T1 handles the request. In another aspect, if the getEntityManager function is not specific to tenant T1 or is otherwise stateless or multi-tenant enabled, the child bean factory for tenant T1 can ask a parent bean factory to handle the request. In this embodiment, in step 1010, the child bean factory for tenant T1 does not override the function in the parent bean factory allowing the parent bean factory to handle the request.

Having received the appropriate entity manager (EntityManager), ConfigService then invokes a function named "getProperty" in order to retrieve property X from EntityManager in step 1012. In step 1014, EntityManager invokes a function named "getDatasource" from Utils to determine the appropriate datasource for the managed entity from which the property X is to be retrieved. In step 1016, Utils again invokes the function named "getFactory" using the tenant information for tenant T1 in order to determine the appropriate bean factory to handle the getDatasource request.

In step 1018, Utils invokes a function named "getDatasource" from the child bean factory for tenant T1. In one aspect, if the getDatasource function is specific to tenant T1, the child bean factory for tenant T1 handles the request. In another aspect, if the getDatasource function is not specific to tenant T1 or is multi-tenant enabled, the child bean factory for tenant T1 can ask a parent bean factory to handle the request. In this embodiment, in step 1020, the child bean factory for tenant T1 invokes a function named "getConnection" from a database for tenant T1 to handle the request.

Having now received connection information for the appropriate datasource or otherwise established a connection, ConfigService then invokes a function named "readProperty" in order to retrieve the value of property X from the database for tenant T1 in step 1022. The value of property X can then be delivered to tenant T1 as the getProperty function returns from execution.

In much the same pattern as above, in step 1024, tenant T2 invokes a function named "getProperty" in order to retrieve property X from the Configuration Service (ConfigService). In step 1026, in order to determine from which entity property X is to be retrieved, ConfigService invokes the function named "getEntityManager" to retrieve an entity manager from the Utility Service (Utils). Utils identifies tenant information from the current session context. In this example, the tenant information identifies tenant T2 as invoking the function in step 1024. In step 1028, Utils invokes the function named "getFactory" using the tenant information for tenant T2 in order to determine the appropriate bean factory to handle the getEntityManager request.

In step 1030, Utils invokes a function named "getEntityManager" from a child bean factory for tenant T2. In one aspect, if the getEntityManager function is specific to tenant T2, the child bean factory for tenant T2 handles the request. In another aspect, if the getEntityManager function is not specific to tenant T2 or is otherwise stateless or multi-tenant enabled, the child bean factory for tenant T2 can ask the parent bean factory to handle the request. In this embodiment, in step 1032, the child bean factory for tenant T2 does not override the function in the parent bean factory allowing the parent bean factory to handle the request.

Having received the appropriate entity manager (EntityManager), ConfigService then invokes a function named "getProperty" in order to retrieve property X from EntityManager in step 1034. In step 1036, EntityManager invokes the function named "getDatasource" from Utils to determine the appropriate datasource for the managed entity from which the property X is to be retrieved. In step 1038, Utils again invokes the function named "getFactory" using the tenant information for tenant T2 in order to determine the appropriate bean factory to handle the getDatasource request.

In step 1040, Utils invokes a function named "getDatasource" from the child bean factory for tenant T2. In one aspect, if the getDatasource function is specific to tenant T2, the child bean factory for tenant T2 handles the request. In another aspect, if the getDatasource function is not specific to tenant T2 or is otherwise stateless or multi-tenant enabled, the child bean factory for tenant T2 can ask the parent bean factory to handle the request. In this embodiment, in step 1042, the child bean factory for tenant T2 invokes a function named "getConnection" from a database for tenant T2 to handle the request.

Having now received connection information for the appropriate datasource or otherwise established a connection, ConfigService then invokes a function named "readProperty" in order to retrieve the value of property X from the database for tenant T2 in step 1044. The value of property X can then be delivered to tenant T2 as the getProperty function returns from execution.

As discussed above, various embodiments provide on premise and cloud deployment support for components that may not be multi-tenant enabled. A single application in a highly non-intrusive way without effecting application functional logic. On premise deployments can run with fixed default tenant and no tenant information needs to be captured anywhere anytime. The application code accesses the hierarchical bean factory to get any tenant specific or shared resources seamlessly without knowledge of multi-tenancy in functional code anywhere.

CONCLUSION

Figure 11:
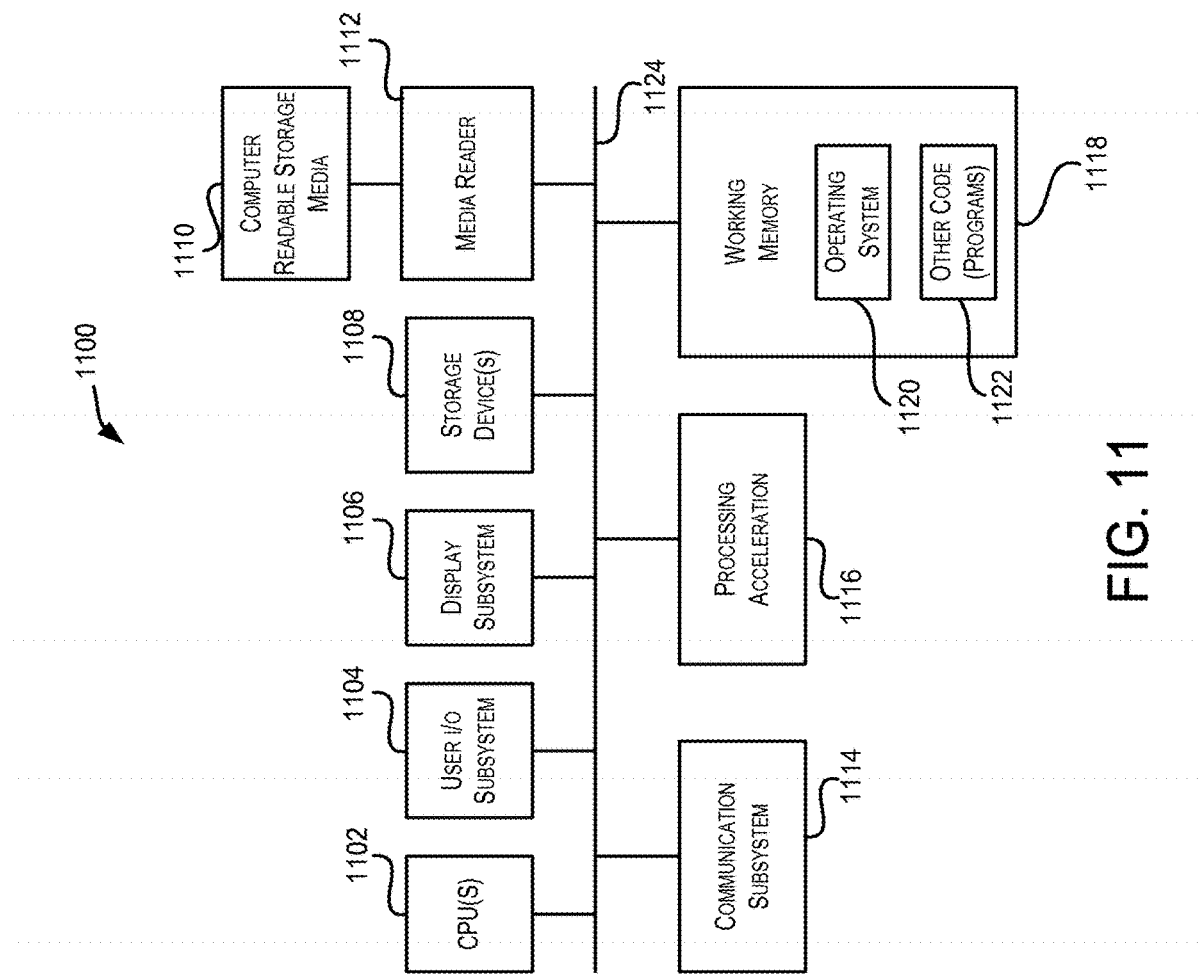
FIG. 11 is a simplified block diagram of a computing system that may be used in accordance with embodiments of the present invention.

FIG. 11 is a simplified block diagram of a computing system 1100 that may be used in accordance with embodiments of the present invention. For example, cloud infrastructure system 110 may comprise one or more computing devices. System 1100 depicted in FIG. 11 may be an example of one such computing device. Computer system 1100 is shown comprising hardware elements that may be electrically coupled via a bus 1124. The components may include one or more processing units 1102, an input subsystem 1104, an output subsystem 1106, storage devices 1108, a computer-readable storage media reader 1112 connected to a computer-readable storage medium 1110, a communication subsystem 1114, a processing acceleration subsystem 1116, and working memory 1118.

Bus subsystem 1124 provides a mechanism for letting the various components and subsystems of computer system 1100 communicate with each other as intended. Although bus subsystem 1124 is shown schematically as a single bus, alternative embodiments of the bus subsystem may utilize multiple busses.

Input subsystem 1104 may include one or more input devices such as a mouse, a keyboard, a pointing device, a touchpad, etc. In general, input subsystem 1104 may include any device or mechanism for inputting information to computer system 1100.

Output subsystem 1106 may include one or more output devices for outputting information from computer system 1100. Examples of output devices include without limitation a display device, a printer, a projection device, etc. In general, output subsystem 1106 may include any device or mechanism for outputting information from computer system 1100.

Processing unit(s) 1102 can include one or more processors, one or more cores of processors, combinations thereof, and the like. In some embodiments, processing unit(s) 1102 can include a general purpose primary processor as well as one or more special purpose co-processors such as graphics processors, digital signal processors, or the like. In some embodiments, some or all processing units 1102 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 1102 can execute instructions stored in working memory 1118 or on storage devices 1108. In various embodiments, processing units 1102 can execute a variety of programs or code instructions and can maintain multiple concurrently executing programs or processes. At any given time, some or all of the program code to be executed can be resident in system working memory 1118, storage devices 1108, and/or on computer-readable storage media 1110. Through suitable programming, processing units 1102 can provide various functionalities described above for performing event stream-related processing. In some embodiments, computer system 1100 may also include a processing acceleration unit 1116, which can include a digital signal processor (DSP), a special-purpose processor, and/or the like.

Storage device(s) 1108 may include memory devices such as disk drives, optical storage devices, and solid-state storage devices such as a random access memory (RAM) and/or a read-only memory (ROM), which can be programmable, flash-updateable and/or the like. Software (programs, code modules, instructions), which when executed by processing unit(s) 1102 to provide the functionality described above, may be stored on storage devices 1108. Storage devices 1108 may also provide a repository for storing data used in accordance with embodiments of the present invention.

Computer-readable storage media reader 1112 can further be connected to a computer-readable storage medium 1110, together (and, optionally, in combination with storage device(s) 1108) comprehensively representing remote, local, fixed, and/or removable memory storage devices plus storage media for temporarily and/or more permanently containing computer-readable information.

Communications subsystem 1114 may permit data to be exchanged with the network and/or any other computers described above with respect to the system environment. Communication subsystem 1114 serves as an interface for receiving data from and transmitting data to other systems from computer system 1100. The communication may be provided using wired or wireless protocols. For example, communication subsystem 1114 may enable computer 1100 to connect to a client device via the Internet. Communication subsystem 1114 may comprise a modem, a network card (wireless or wired), an infra-red communication device, a GPS receiver, etc.

Working memory subsystem 1118 may include a number of memories including a main random access memory (RAM) for storage of instructions and data during program execution and a read only memory (ROM) in which fixed instructions are stored. Software elements such as an operating system 1120 and/or other code 1122, such as an application program (which may be a client application, Web browser, mid-tier application, RDBMS, etc.), may be stored in working memory 1118. In an exemplary embodiment, working memory 1118 may include executable code and associated data structures (such as caches) used for processing events and enabling variable duration windows processing as described above.

It should be appreciated that alternative embodiments of computer system 1100 may have more or less components with numerous variations from that described above. For example, customized hardware might also be used and/or particular elements might be implemented in hardware, software (including portable software, such as applets), or both. Further, connection to other computing devices such as network input/output devices may be employed.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

That which is claimed is:

1. A method comprising:
   receiving, at a computing device having one or more processors, a hierarchical bean factory associated with an application in a multi-tenant environment of a cloud infrastructure system, a parent bean factory representing a shared application context that is shared by entities in the hierarchical bean factory and each child bean factory representing an entity specific application context that is specific to each child in the hierarchical bean factory;
   receiving a request to invoke a function associated with the application from a tenant in the multi-tenant environment;
   identifying tenant information from the request, wherein the tenant information is identified during login of a user of the tenant to the cloud infrastructure system;
   adding the identified tenant information to a session context; determining, by the computing device, an entity based on the tenant information in the request;
   determining, by the computing device, a child bean factory in the hierarchical bean factory that is associated with the entity that is determined based on the tenant information in the request;
   accessing the application using the child bean factory that is associated with the entity; and
   invoking, by the computing device, the function associated with the application using the child bean factory specific to the entity and the parent bean factory associated with the child bean factory specific to the entity,
   wherein the child bean factory comprises services available in the parent bean factory and the child bean factory, and
   wherein the parent bean factory is shared by a plurality of different tenants and is configured to provision a service for a plurality of child bean factories, each of the plurality of child bean factories belonging to the plurality of different tenants, in order to enable sharing of services between a plurality of tenants in the multi-tenant environment.

2. The method of claim 1 further comprising:
storing entity information in a session context; and
accessing the entity information in order to determine the child bean factory.

3. The method of claim 2 further comprising:
generating the entity information in response to authenticating a user of the tenant in the cloud infrastructure system, the tenant being the determined entity.

4. The method of claim 1 further comprising:
defining one or more interfaces in the parent bean factory; and
restricting access to the one or more interfaces in the parent bean factory to the child bean factory.

5. The method of claim 1 further comprising:
defining one or more entity aware components in the child bean factory; and
sharing access to the entity aware components based on only loading each entity aware component once per entity.

6. The method of claim 1 further comprising:
defining one or more shared components in the parent bean factory; and
sharing access to the shared components based on only loading each shared component once per application instance.

7. The method of claim 1 wherein the computing device forms part of a multi-tenant cloud computing environment.

8. The method of claim 1 wherein the computing device forms part of a single-tenant on-premise computing environment.

9. The method of claim 1 wherein the application includes a Java® service, a customer resource management (CRM) service, or a human capital management (HCM) service.

10. The method of claim 1, wherein the multi-tenant environment is a multi-tenant cloud computing environment that enables a plurality of separate tenants each having a separate identity domain to share a cloud infrastructure system.

11. The method according to claim 1, wherein beans in the child bean factory specific to the entity override beans in the parent bean factory.

12. The method according to claim 1, wherein the hierarchical bean factory comprises a plurality of bean factories that handle a content and shared resources of each tenant in the multi-tenant environment.

13. The method according to claim 1, wherein the multi-tenant environment comprises multiple separate tenants sharing an identity domain.

14. The method according to claim 1, wherein the function associated with the application is invoked in accordance with a utility service that identifies tenant information.

15. The method according to claim 1, wherein invoking the function associated with the application is authorized by an identity management module configured to provide identity services.

16. The method according to claim 1, wherein in response to a component being defined in the child bean factory, overriding the component as defined in the parent bean factory to be in accordance with the component as defined in the child bean factory, wherein the component enables provisioning of a service.

17. The method according to claim 1, wherein the service comprises one of an online data storage service, a data backup service, a Web-based e-mail service, a document collaboration service, a database processing service, and a technical support service.

18. The method according to claim 1, wherein the tenant information in the child bean factory is configured to be referenced throughout the session context.

19. A non-transitory computer-readable medium storing a computer program product which when executed by a processor of a computer systems causes the processor to:
receive a hierarchical bean factory associated with an application in a multi-tenant environment of a cloud infrastructure system, a parent bean factory representing a shared application context that is shared by entities in the hierarchical bean factory and each child bean factory representing an entity specific application context that is specific to each child in the hierarchical bean factory;
receive a request to invoke a function associated with the application from a tenant in the multi-tenant environment;
identify tenant information from the request, wherein the tenant information is identified during login of a user of the tenant to the cloud infrastructure system;
add the identified tenant information to a session context;
determine an entity based on the tenant information in the request;
determine a child bean factory in the hierarchical bean factory that is associated with the entity that is determined based on the tenant information in the request;
access the application using the child bean factory that is associated with the entity; and
cause the function associated with the application to be invoked using the child bean factory specific to the entity and the parent bean factory associated with the child bean factory specific to the entity,
wherein the child bean factory comprises services available in the parent bean factory and the child bean factory, and
wherein the parent bean factory is shared by a plurality of different tenants and is configured to provision a service for a plurality of child bean factories, each of the plurality of child bean factories belonging to the plurality of different tenants, in order to enable sharing of services between a plurality of tenants in the multi-tenant environment.

20. The non-transitory computer-readable medium of claim 19 wherein the computer program product further causes the processor to:
store entity information in a session context; and
access the entity information in order to determine the child bean factory.

21. The non-transitory computer-readable medium of claim 20 wherein the computer program product further causes the processor to:
generate the entity information in response to authenticating a user of a tenant in a cloud infrastructure system, the tenant being the determined entity.

22. The non-transitory computer-readable medium of claim 19 wherein the computer program product further causes the processor to:
receive one or more interfaces defined in the parent bean factory; and
restrict access to the one or more interfaces in the parent bean factory to the child bean factories.

23. The non-transitory computer-readable medium of claim 19 wherein the computer program product further causes the processor to:
receive information identifying one or more entity aware components in the child bean factory; and share access to the entity aware components based on only loading each entity aware component once per entity.

24. The non-transitory computer-readable medium of claim 19 wherein the computer program product further causes the processor to:
receive information identifying one or more shared components in the parent bean factory; and
share access to the shared components based on only loading each shared component once per application instance.

25. The non-transitory computer-readable medium of claim 19 wherein the application includes a Java® service, a customer resource management (CRM) service, or a human capital management (HCM) service.

26. A system comprising:
at least one processor;
a memory storing a computer program product which when executed by the processor causes the processor to:
receive a hierarchical bean factory associated with an application in a multi-tenant environment of a cloud infrastructure system, a parent bean factory representing a shared application context that is shared by entities in the hierarchical bean factory and each child bean factory representing an entity specific application context that is specific to each child in the hierarchical bean factory;
receive a request to invoke a function associated with the application from a tenant in the multi-tenant environment;
identify tenant information from the request, wherein the tenant information is identified during login of a user of the tenant to the cloud infrastructure system;
add the identified tenant information to a session context; determine an entity based on the tenant information in the request;
determine a child bean factory in the hierarchical bean factory that is associated with the entity that is determined based on the tenant information in the request;
access the application using the child bean factory that is associated with the entity; and
cause the function associated with the application to be invoked using the child bean factory specific to the entity and the parent bean factory associated with the child bean factory specific to the entity,
wherein the child bean factory comprises services available in the parent bean factory and the child bean factory, and
wherein the parent bean factory is shared by a plurality of different tenants and is configured to provision a service for a plurality of child bean factories, each of the plurality of child bean factories belonging to the plurality of different tenants, in order to enable sharing of services between a plurality of tenants in the multi-tenant environment.

27. The system of claim 26 wherein the computer program product further causes the processor to:
receive information identifying one or more interfaces in the parent bean factory; and
restrict access to the one or more interfaces to the child bean factories.

28. The system of claim 26 wherein the computer program product further causes the processor to:
receive information identifying one or more entity aware components in the child bean factory; and
share access to the entity aware components based on only loading each entity aware component once per entity.

29. The system of claim 26 wherein the computer program product further causes the processor to:
receive information identifying one or more shared components in the parent bean factory; and
share access to the shared components based on only loading each shared component once per application instance.

* * * * *

UNITED STATES PATENT AND TRADEMARK OFFICE
CERTIFICATE OF CORRECTION

PATENT NO. : 10,182,107 B2  
APPLICATION NO. : 15/178435  
DATED : January 15, 2019  
INVENTOR(S) : Jain It is certified that error appears in the above-identified patent and that said Letters Patent is hereby corrected as shown below:

In the Specification

In Column 2, Line 3, after "anywhere" insert -- . --.

Signed and Sealed this  
Seventh Day of January, 2020

Andrei Iancu  
*Director of the United States Patent and Trademark Office*